(12) United States Patent
Govyadinov et al.

(10) Patent No.: US 11,879,844 B2
(45) Date of Patent: Jan. 23, 2024

(54) MODULAR AND TILED OPTICAL SENSORS

(71) Applicant: Hewlett-Packard Development Company, L.P., Spring, TX (US)

(72) Inventors: Alexander Govyadinov, Corvallis, OR (US); Brett E. Dahlgren, Corvallis, OR (US); Brian John Keefe, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 269 days.

(21) Appl. No.: 17/417,533

(22) PCT Filed: Apr. 30, 2019

(86) PCT No.: PCT/US2019/030029
§ 371 (c)(1),
(2) Date: Jun. 23, 2021

(87) PCT Pub. No.: WO2020/222825
PCT Pub. Date: Nov. 5, 2020

(65) Prior Publication Data
US 2022/0113255 A1 Apr. 14, 2022

(51) Int. Cl.
*G01N 21/64* (2006.01)
(52) U.S. Cl.
CPC ..... *G01N 21/6486* (2013.01); *G01N 21/6454* (2013.01); *G01N 2021/6421* (2013.01)
(58) Field of Classification Search
CPC .................. G01N 21/00; G01N 21/64; G01N 2021/6456; G01N 21/27; G01N 21/6463; G01N 30/74; G01J 3/0205; G01J 3/0291; G01J 3/0256; G01J 3/2803; G01J 3/0259; G01J 2003/1239; G01J 3/02; G01J 5/0215; A61B 1/00163; A61B 5/1455; A61B 2562/0233; G02B 23/2461
See application file for complete search history.

(56) References Cited

U.S. PATENT DOCUMENTS

| | | | |
|---|---|---|---|
| 5,039,490 | A | 8/1991 | Marsoner et al. |
| 5,272,518 | A | 12/1993 | Vincent |
| 5,812,272 | A | 9/1998 | King et al. |
| 5,958,349 | A | 9/1999 | Petersen et al. |
| 6,582,052 | B2 | 6/2003 | Sarmast et al. |
| 6,809,855 | B2 | 10/2004 | Hubble, III et al. |

(Continued)

FOREIGN PATENT DOCUMENTS

| | | |
|---|---|---|
| CN | 102279174 B | 4/2015 |
| CN | 107374584 A | 11/2017 |

(Continued)

*Primary Examiner* — Don K Wong
(74) *Attorney, Agent, or Firm* — Foley & Lardner LLP

(57) ABSTRACT

An example device includes an array of sensor modules. A sensor module includes a body to be positioned in alignment with a planar target, a light source coupled to the body to emit light to the planar target along a source optical path, and a plurality of light sensors coupled to the body. Each light sensor is to sense a different wavelength of light received from the planar target along a sensor optical path. The sensor optical path is different from the source optical path. The bodies of the array of sensor modules are arranged in a planar tiling pattern with respect to a longitudinal axis of the planar target.

15 Claims, 20 Drawing Sheets

(56) References Cited

U.S. PATENT DOCUMENTS

| | | |
|---|---|---|
| 6,940,598 B2 | 9/2005 | Christel et al. |
| 7,110,122 B2 | 9/2006 | Van Brocklin et al. |
| 7,119,345 B2 | 10/2006 | King |
| 7,212,292 B2 | 5/2007 | Van Brockl et al. |
| 7,239,402 B2 | 7/2007 | Soler et al. |
| 7,407,798 B2 | 8/2008 | Oldham et al. |
| 7,489,396 B1 | 2/2009 | Vrhel et al. |
| 7,612,185 B2 | 11/2009 | Lu et al. |
| 7,760,253 B2 | 7/2010 | DiCarlo |
| 8,004,680 B2 | 8/2011 | Martinez |
| 8,100,540 B2 | 1/2012 | Huebner |
| 8,149,405 B2 | 4/2012 | DiCarlo et al. |
| 8,203,749 B2 | 6/2012 | Vilar et al. |
| 8,253,996 B2 | 8/2012 | Martinez et al. |
| 8,390,810 B2 | 3/2013 | Clark et al. |
| 8,422,016 B2 | 4/2013 | Picciotto et al. |
| 8,520,209 B2 | 8/2013 | Chatow et al. |
| 8,625,157 B2 | 1/2014 | Martinez et al. |
| 8,665,438 B2 | 3/2014 | Clark et al. |
| 9,007,586 B2 | 4/2015 | Clark et al. |
| 9,488,571 B2 | 11/2016 | Bahatt et al. |
| 9,651,425 B2 | 5/2017 | Clark et al. |
| 9,989,465 B2 | 6/2018 | Kao |
| 11,086,013 B2 * | 8/2021 | Pacala .................. G01S 17/931 |
| 2009/0088338 A1 | 4/2009 | Liu et al. |
| 2015/0346097 A1 | 12/2015 | Battrell et al. |
| 2017/0343474 A1 | 11/2017 | Hunter |
| 2017/0360316 A1 | 12/2017 | Gu et al. |

FOREIGN PATENT DOCUMENTS

| | | |
|---|---|---|
| WO | WO-2005037085 A2 | 4/2005 |
| WO | WO-2019143319 A1 | 7/2019 |
| WO | WO-2019143392 A1 | 7/2019 |

\* cited by examiner

MODULAR AND TILED OPTICAL SENSORS

BACKGROUND

Optical sensors are often used to monitor processes in which a change in optical characteristic indicates a change in a process. An optical sensor may be used to monitor a biological, chemical, or biochemical process, where illumination is provided to the process to trigger a response that is detectable to the sensor.

DETAILED DESCRIPTION

Figure 1:
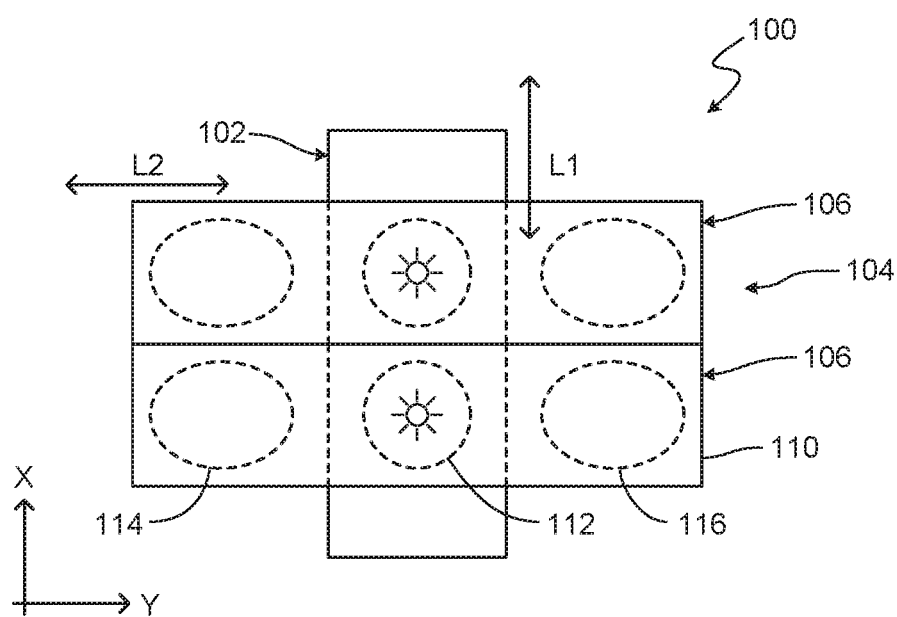
FIG. 1 is a plan view of an example device including sensor modules arranged in a planar tiling pattern with respect to a longitudinal axis of a planar target.

Illumination and sensing of a target, such as a reaction chamber, may require a high degree of complexity in optical design. Such complexity tends to increase with an increasing number of wavelength ranges of interest. That is, additional optics, sensors, and/or light sources may be required for additional wavelengths of interest. Further, known optical designs tend to suffer from a lack of scalability, such that a change to a target, such as a change to target geometry, may require significant redesign of illumination and sensor optics.

In one conventional type of arrangement, a beam splitter or dichroic mirror splits a common illumination/sensing light path at a target into separate paths to/from a respective detector and light source. Such arrangements are typically large scale and are of fixed optical design. Investigating additional wavelengths of interests often requires adding additional beam splitters and light paths. Movable filters, such as a color wheel, are sometimes used to multiplex light paths for different wavelengths. However, this increases complexity and may increase failure rate due to moving parts.

In another conventional apparatus, modular portable in-vitro (PIV) diagnostic detectors are provided in an alternating arrangement along the narrow width of a cartridge. A series of test slots spans the narrow width of the cartridge and each detector is aligned with a different test slot. This arrangement is limited in scalability due to the detectors and slots being arranged linearly across the width of the cartridge.

The technical problems described above may be solved by an array of optical sensor modules that may be efficiently tiled or tessellated with respect to a planar target or targets. Sensor modules may be arranged in a planar tiling pattern or tessellation with respect to a longitudinal axis of a planar target. Various tiling patterns may be used, such as staggered, rectangular aligned, and rectangular orthogonal with respect to the planar target or targets. A set of sensor modules may be geometrically interchangeable, so that sensor modules for specific wavelengths of interest may be selected for a particular assembly. Complexity may be reduced and compactness may be increased due to common geometry of sensor modules. Scalability may be increased, as sensor modules may be added without optical redesign. A tiling pattern or tessellation may be selected to optimize overlap with a planar target or targets. Further, sensor modules may be formed into solid state assemblies without moving parts, thereby increasing reliability and reducing complexity.

In examples described herein, a device includes an array of sensor modules. A sensor module includes a body to be positioned in alignment with a planar target, a light source coupled to the body to emit light to the planar target along a source optical path, and a plurality of light sensors coupled to the body. Each light sensor is to sense a different wavelength of light received from the planar target along a sensor optical path. The sensor optical path is different from the source optical path. The bodies of the array of sensor modules are arranged in a planar tiling pattern with respect to a longitudinal axis of the planar target.

The planar tiling pattern may include a staggered arrangement, in which alternate sensor modules of the array of sensor modules are to be positioned in relative planar alignment with different planar targets that include the planar target.

The planar target may be rectangular and the body of each sensor module may be rectangular.

The planar tiling pattern may include the body being in longitudinal alignment with the planar target.

The planar tiling pattern may include the body being orthogonal with the planar target.

The array of sensor modules may be positioned in alignment with a plurality of planar targets that includes the planar target.

The planar tiling pattern may include a regular tessellated pattern.

In a sensor module of the array of sensor modules, the source optical path may be normal to the body and the sensor optical path may be at an acute angle to the body.

In a sensor module of the array of sensor modules, the source optical path may be at an acute angle to the body and the sensor optical path may be normal to the body.

The plurality of light sensors may be arranged in a regular pattern around the light source. The plurality of light sensors may be equidistant to the light source.

In a sensor module of the array of sensor modules, filters for different wavelengths may be positioned in the sensor optical path of each light sensor of the plurality of light sensors.

A sensor module of the array of sensor modules may include a plurality of light sources.

The planar target may include a reaction chamber and a heater for a polymerase chain reaction (PCR). The light source and the plurality of light sensors may be selected according to expected fluorescence signals of the polymerase chain reaction.

The planar target may include a reaction chamber for an immunoassay.

FIG. 1 shows an example optical sensing device 100. The device 100 may be used to determine a characteristic of a biological, chemical, or biochemical process that occurs at a planar target 102. Examples of such a process include nucleic acid amplification and nucleic acid testing (NAT) processes, such as a PCR, real-time or quantitative polymerase chain reaction (qPCR), reverse transcription polymerase chain reaction (RT-PCR), loop-mediated isothermal amplification (LAMP), and similar. Other examples of such a process include an immunoassay. Further example processes are provided below.

The optical sensing device 100 includes an array 104 of sensor modules 106. A sensor module 106 includes a body 110, a light source 112 coupled to the body 110, and a plurality of light sensors 114, 116 coupled to the body 110. The light source 112 may provide excitation energy to the planar target 102 to cause material, such as a probe, dye, or marker, at the planar target 102 to fluoresce. A sensor module 106 may be solid-state device without moving parts.

The optical sensing device 100 may be provided with an array 104 of sensor modules 106 sensitive to different wavelengths of light. That is, the optical sensing device 100 may include a first sensor module 106 that emits and captures light of a first set of wavelengths and a second sensor module 106 that emits and captures light of a second set of wavelengths that is different from the first set of wavelengths.

The planar target 102 may include passive component, an active component, or a combination of such. Example passive components include a reaction chamber, a network of microfluidic channels, or similar, which may be made of silicon, silicon oxide, photoresist, polydimethylsiloxane (PDMS), cyclic olefin copolymer (COC), other plastics, glass, or other materials that may be made using microfabrication technologies. A passive component may include a solid compound to interact with fluid delivered by a microfluidic channel. A solid compound may be solid in bulk, may be a powder or particulate, may be integrated into a fibrous material, or similar. Example active components include a heater, pump, sensor, mixer, droplet ejector, or similar component to perform action on a fluid.

The planar target 102 may have an elongate shape, such as an elongate rectangle, having a longitudinal axis L1. The planar target 102 may be longer than it is wide by a factor such as 2, 4, 8, 20, 50 times or more. The planar target 102 may be referred to as a sliver.

The body 110 of each sensor module 106 may secure the respective light source 112 and light sensors 114, 116 in fixed relative positions. The light source 112 and light sensors 114, 116 may each be fixed to the body 110. The body 110 may include a substrate on which the light source 112 and light sensors 114, 116 may be formed. The body 110 may include a silicon (Si) substrate or a substrate of a similar material.

The body 110 of each sensor module 106 is positioned in alignment with the planar target 102. In this example, the body 110 is rectangular, with a longitudinal axis L2, and is oriented orthogonally with respect to the longitudinal axis L1 of the planar target 102. That is, the body 110 overlaps the planar target 102 and the longitudinal axis L2 of the body 110 is perpendicular to the longitudinal axis L1 of the planar target 102.

Orthogonal, perpendicular, normal, acute, angled, aligned, and similar terminology used herein allows for some deviation from exact angles. Allowable deviation may be informed by the specific implementation. Some implementations may have less sensitivity to deviation than other implementations. For example, it may be permissible to have an angle that deviates by 5, 10, 15, or more degrees.

The light source 112 of each sensor module 106 is oriented to emit light to the planar target 102 along a source optical path. The light source 112 may include a light-emitting diode (LED), a semiconductor laser, or similar. The light source 112 may be a single-color or multi-color light source. A multi-color light source may include multiple discrete light sources, such as multiple LEDs that emit different wavelengths of light. Optics, such as a lens, may be provide to the light source 112. A filter, such as a short-pass filter, long-pass filter, bandpass filter, or similar, may be provided to the light source 112.

Each light sensor 114, 116 is oriented to sense light from the planar target 102 along a sensor optical axis that is different from the source optical path of the light source 112. That is, each sensor 114, 116 is off-axis with respect to the light source 112. In this example, each light sensor 114, 116 senses a different wavelength of light. In other examples, a light sensor may sense the same wavelength of light as another light sensor. It is contemplated that a plurality of light sensors 114, 116 collectively sense different wavelengths of light and may also sense common wavelengths of light. A light sensor 114, 116 may include a photodiode or similar device.

The light sensors 114, 116 of each sensor module 106 may be positioned on either side the light source 112. Each light sensor 114, 116 may be spaced apart from the light source 112 by the same distance. In various examples, equidistant spacing of light sensors 114, 116 from a central light source 112 may be a three-dimensional distance (e.g., a distance in X-Y-Z space). In other examples, equidistant spacing of light sensors 114, 116 from a central light source 112 may be in an X-Y plane parallel to a planar target, with a Z distance component of sensor placement able to be varied among sensors 114, 116. The same principles apply to examples with multiple light sources 112 that may be equidistant from a given light sensor or sensors 114, 116. Equidistant spacing may allow for various body geometries that are conducive to tiling, such as the example body geometries discussed herein.

The bodies 110 of the array 104 of sensor modules 106 are arranged in a planar tiling pattern with respect to the longitudinal axis L1 of the planar target 102. In this example, each body 110 arranged such that its longitudinal axis L2 is perpendicular to the longitudinal axis L1 of the planar target 102. The light source 112 of each body 110 may be aligned with the longitudinal axis L1. The light sensors 114, 116 of each body may straddle the longitudinal axis L1. This compact arrangement allows for a high density of sensors relative to the planar target 102. The planar target 102 may be provided with a multiplex tiled array of different sensor modules 106 to simultaneously assess different aspects of a process performed at the planar target 102. Further, the sensor modules 106 may be modular and selected for a particular implementation of the optical sensing device 100. That is, batches of sensor modules 106 may be premanufactured and selected for use with a particular optical sensing device 100 when such device 100 is under manufacture. Selected sensor modules 106 may be assembled to form a solid-state optical sensing device 100 without moving parts. Manufacture of optical sensing devices 100 may be scalable, in that any practical number of sensor modules 106 may be arranged along the length of a planar target 102. For example, for a planar target 102 of a particular length, an additional wavelength of interest may be added by adding a corresponding sensor module 106.

A planar tiling pattern of the array 104 of sensor modules 106 may be in a plane parallel to the plane of planar target 102, for example an X-Y plane. The bodies 110 of the sensor modules 106 and the planar target 102 may be stacked along a Z axis. Generally, the bodies 110 and the planar target 102 have lengths and widths (X, Y) greater than thickness (Z).

A planar tiling pattern may be a regular pattern that repeats in the X-Y plane and that may be added to in various direction in the X-Y plane. Gaps between bodies 110 of the sensor modules 106 are permitted to the extent that the increased overall size of the device 100 can be tolerated. The bodies 110 may be shaped as tileable polygons in the X-Y plane (e.g., rectangles, triangles, crosses, hexagons, etc.) and may be tessellated or tiled to yield a suitable overall shape for the device 100 that efficiently matches the shape and layout of the planar target or targets 102.

In operation, the light source 112 of a sensor module 106 is energized to thereby emit light energy to the planar target 102. Material at the planar target 102 responds to received light energy, by for example fluorescing. A fluorescent emission may be of a wavelength different from an excitation wavelength. The light sensors 114, 116 of the sensor module 106 sense light emanating from the planar target 102, which provides information about the state of material, such as a reaction product, at the planar target 102.

Figure 2:
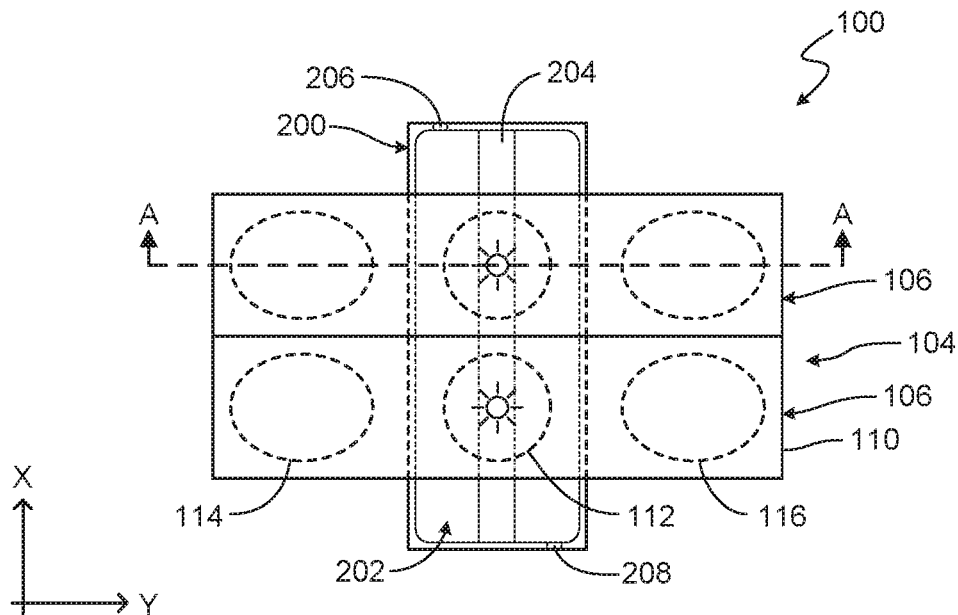
FIG. 2 is a plan view of an example device including sensor modules arranged in a planar tiling pattern with respect to a longitudinal axis of a planar target that includes a reaction chamber and a heater.

FIG. 2 shows an example optical sensing device 100 with a microreactor 200 as a planar target. Features and aspects of the device 100 may be similar or identical to the other devices described herein. The other devices and systems disclosed herein may be referenced for description not repeated here, with like terminology and/or like reference numerals indicating like components.

The microreactor 200 includes a reaction chamber 202 and a heater 204 for a polymerase chain reaction such as qPCR, RT-PCR, or similar. The reaction chamber 202 may be formed from a substrate, such as a silicon substrate or similar substrate enclosed by a capillary lid. The heater 204 may be formed by a resistive element disposed on the substrate or within layers of the substrate. Additional microfluidic components may be provided to the microreactor 200, such as pumps, valves, sensor electrodes, and similar.

The reaction chamber 202 may be fed by an inlet 206 to introduce fluid into the chamber 202 and may feed an outlet 208 to convey fluid out of the chamber 202. Any number of inlets 206 and outlets 208 may be provided to convey any number of reagents and reaction or waste products. The reaction chamber 202 may be microfluidic in scale and may have dimensions in the order of millimeters.

The light sources 112 and light sensors 114, 116 of the sensor modules 106 may be selected according to expected fluorescence signals of the polymerase chain reaction to be performed in the reaction chamber 202.

In an example qPCR implementation, an optical sensing device 100 is provided with sensor modules 106 selected with light sensors 114, 116 responsive to selected fluorescent reporters. A planar target 102 includes a reaction chamber 202 that may be thermally cycled by the heater 204. In operation, a nucleic acid (e.g., DNA) target is introduced into the chamber 202 with sequence-specific probes labelled with the fluorescent reporters. The chamber is thermally cycled to perform denaturing, annealing, and extension. During annealing, probes and primers anneal to the target. Polymerization of a new DNA strand is initiated from the primers. When the polymerase reaches the probe, the probe degrades thereby separating the fluorescent reporter from the quencher, resulting in an increase in fluorescence. Fluorescence of a given wavelength is sensed by the respective light sensor 114, 116 so as to determine the respective quantification cycle. As such, multiplex fluorescent signals may be monitored with a compact arrangement of sensor modules 106.

In other example implementations, other color or light generating reactions, such as bioluminescence, particle movement (light/dark), ink properties, enzyme-linked immunosorbent assay (ELISAs), biomarker detection/identification, immunoassays, immunoassays with conjugated fluorophores, or similar may be performed. Various implementations may use fluorescence or other light-based detection or measurement, particularly with the parallel sensor multiplexing discussed herein. Various implementations may use sensor multiplexing at one planar target (reaction chamber), sensor singleplexing at multiple planar targets (reaction chambers), or a combination of such. Various implementations may use multiple planar targets with lateral flow using porous or paper-like media.

The techniques described herein allow for agnostic design regarding antibody and/or antigen detection and for flexibility with respect to molecular targets and immunoassay format.

In an example immunoassay implementation, an antibody (or antigen) is used to detect the presence/concentration of a molecule or macromolecule in a solution. The solution may be provided with a suitable fluorescent label or reporter. A planar target 102 includes a reaction chamber 202 to receive such a solution. A corresponding array 104 of sensor modules 106 is provided to the planar target 102. The array 104 has a tiling pattern to match the reaction chamber 202 in a space-efficient manner. The specific sensor modules 106 are selected with regard to the label/reporter used. An array of planar targets 102 may be provided for different solutions to test, which may contain different analytes and fluorescent labels/reporters. Accordingly, the array 104 of sensor modules 106 may be made sufficient in size and tiling pattern to capture signals from each of the planar targets 102. Each sensor module 106 may have its sensitive wavelength(s) selected based on which planar target 102 that it overlies. An optical sensing device 100 can therefore be assembled from the building blocks of tileable sensor modules 106 and planar targets 102 to accommodate a particular immunoassay format and set of analytes and respective labels/reporters.

Figure 3:
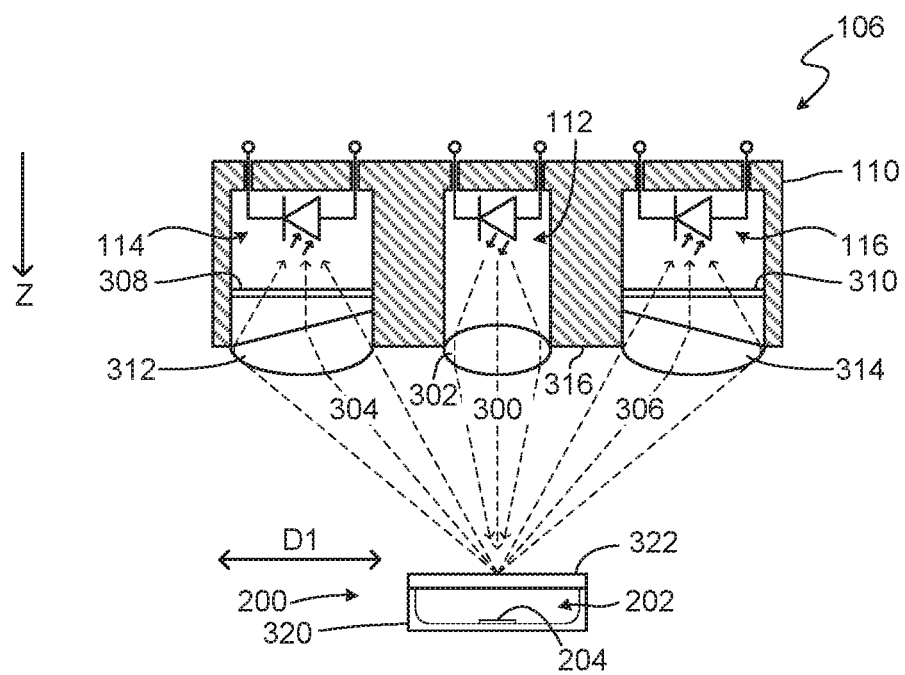
FIG. 3 is a cross-sectional view taken at section line A-A of an example sensor module of FIG. 2.

As shown in FIG. 3, the bodies 110 of the sensor modules 106 may overlap the microreactor 200 or other planar target in the direction D1 of the narrower length of the microreactor 200 or other planar target. The terms over, overlap, and overlie, as used herein, are for convenience only. A body 110 may be over, under, or beside a planar target, depending on the orientation of the frame of reference, all such spatial relationships are within the scope of the terms over, overlap, overlie, and similar.

The light source 112 emits light to the planar target 200 along a source optical path 300. In this example, the source optical path 300 includes a lens 302 to focus emitted light onto the planar target 200. The source optical path 300 may be normal to a target-facing boundary 316 of the body 110, in that the light source 112 emits light orthogonally to the plane of the body 110.

Each light sensor 114, 116 senses a different wavelength of light received from the planar target 200 along a respective sensor optical path 304, 306 that is non-coincident with the source optical path 300. Each sensor optical path 304, 306 may be at an acute angle to the target-facing boundary 316 of the body 110, as compared to the normal source optical path 300.

A filter 308, 310 may be provided to a respective sensor optical path 304, 306. The filter 308, 310 filters light incident to the respective sensor 114, 116 to provide a target wavelength for the sensor 114, 116. A filter 308, 310 may be a dichroic filter, a long-pass filter, a short-pass filter, a band-pass filter, a dye-based color filter, or similar. Further, a sensor optical path 304, 306 may include a lens 312, 314 to direct light to the respective sensor 114, 116.

A lens 302, 312, 314 in an optical path 300, 304, 306 may be a spherical lens, an aspherical off-axis lens, a flat Fresnel lens, or similar. In addition to or as an alternative to a lens, an optical path 300, 304, 306 may include a diffractive element, transmissive or reflective components (e.g., a blazed diffractive grating), or similar. Collection optics at a sensor optical path 304, 306 may be reflective or catadioptric to increase a range of emission ray angles visible to the respective light sensor 114, 116.

The light source 112 may be a single light source. A wavelength of light emitted by the light source 112 may excite material at the planar target 200 to emit light of a different wavelength. A wavelength sensitivity of a light sensor 114, 116, such as enabled by a filter 308, 310 in a respective sensor optical path 304, 306, may be selected based on the expected wavelength of light incident from the planar target 200. In one example, the light source 112 emits blue light and the filters 308, 310 configure the light sensors 114, 116 to be sensitive to green and orange light, respectively.

A plurality of light sources 112 of different emissive wavelengths, or a wideband light source 112, may be provided to emit light of a plurality of respective wavelengths or at a wide range of wavelengths. This may allow for a wider range or greater diversity of wavelength sensitivities for the light sensors 114, 116.

Regarding the planar target, the microreactor 200 may be formed by the shaping of a substrate, such as a silicon, ceramic, or other dielectric substrate. The substrate may form a lower body 320 having a base and walls to define the reaction chamber 202. A light-transmissive lid 322 may be attached to the lower body 320 to seal the reaction chamber 202 and allow light to enter and exit the reaction chamber 202. The lid 322 may be made of glass, transparent polymer, or other transparent or translucent material.

Figure 4:
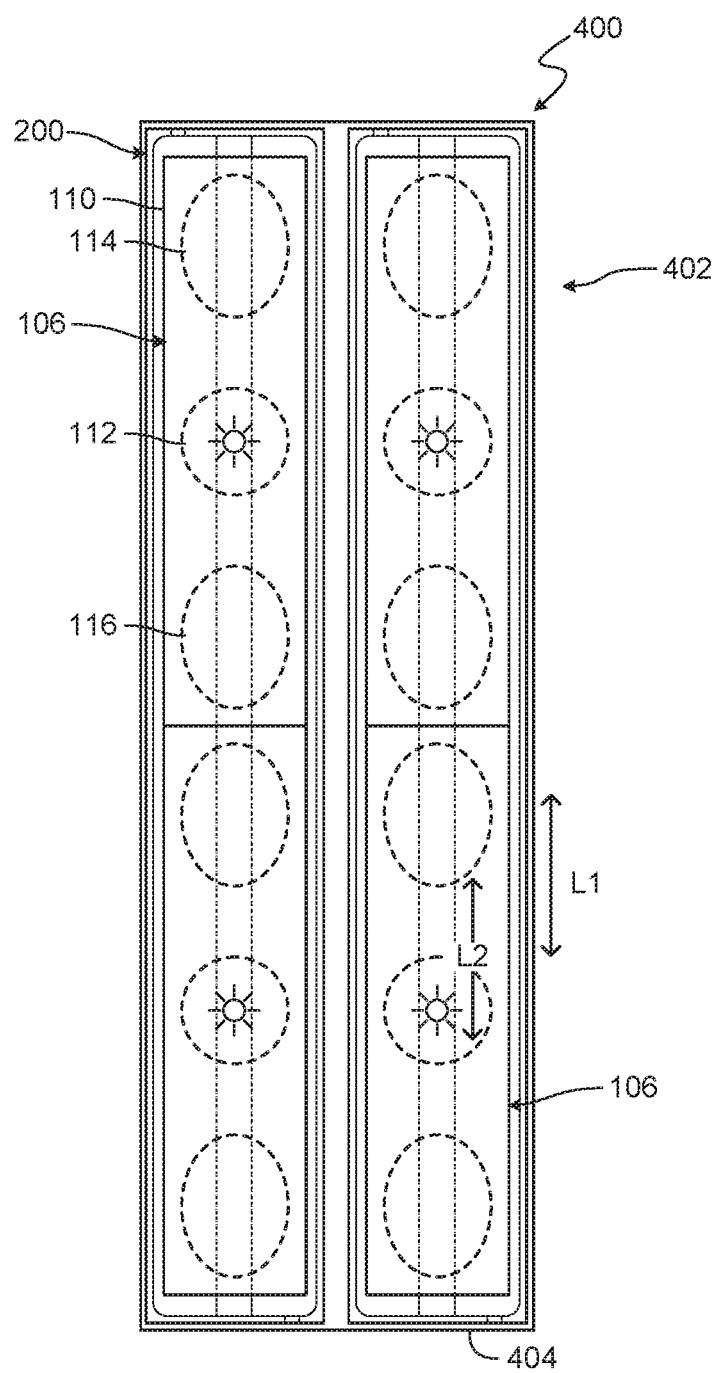
FIG. 4 is a plan view of an example device including sensor modules arranged in a planar tiling pattern that runs parallel to a planar target.

FIG. 4 shows an example optical sensing device 400 that includes an array 402 of sensor modules 106 arranged in a planar tiling pattern that runs parallel to a planar target 200, such as a microreactor. Features and aspects of the device 400 may be similar or identical to the other devices described herein. The other devices and systems disclosed herein may be referenced for description not repeated here, with like terminology and/or like reference numerals indicating like components.

The planar tiling pattern is the rectangular body 110 of each sensor module 106 arranged in longitudinal alignment with the rectangular planar target 200. That is, the longitudinal axis L2 of each sensor module 106 is parallel to the longitudinal axis L1 of the planar target 200. The light source 112 and light sensors 114, 116 may overlie the planar target 200.

A plurality of planar targets 200 may be provided in array in which long sides of planar targets 200 are adjacent. Any practical number of planar targets 200 may be provided. Planar targets 200 may share a common substrate 404 or may be attached to a common substrate 404. The array 402 of sensor modules may extend over such array of planar targets 200, with different sensor modules 106 aligning with different planar targets 200.

In various examples, a plurality of planar targets 102, 200 may be applied to the same overall process. Planar targets may be connected by a microfluidic channel or network and used to perform different aspects of a process. In a NAT example, a plurality of planar targets is provided with the same prepared nucleic acid sample, and different planar targets are used to test for different target sequences. Suitable sensor modules may be provided to each of the planar targets for the respective target sequence. In another example, a plurality of planar targets is to be provided with different dilutions/concentrations of a material of interest and the respective sensor modules are selected accordingly. In various examples, a plurality of planar targets may be fluid connected in series, parallel, or via a complex fluid network. The fluid connections of a plurality of planar targets may include passive and/or active components, such as valves, pumps, and the like.

Figure 5:
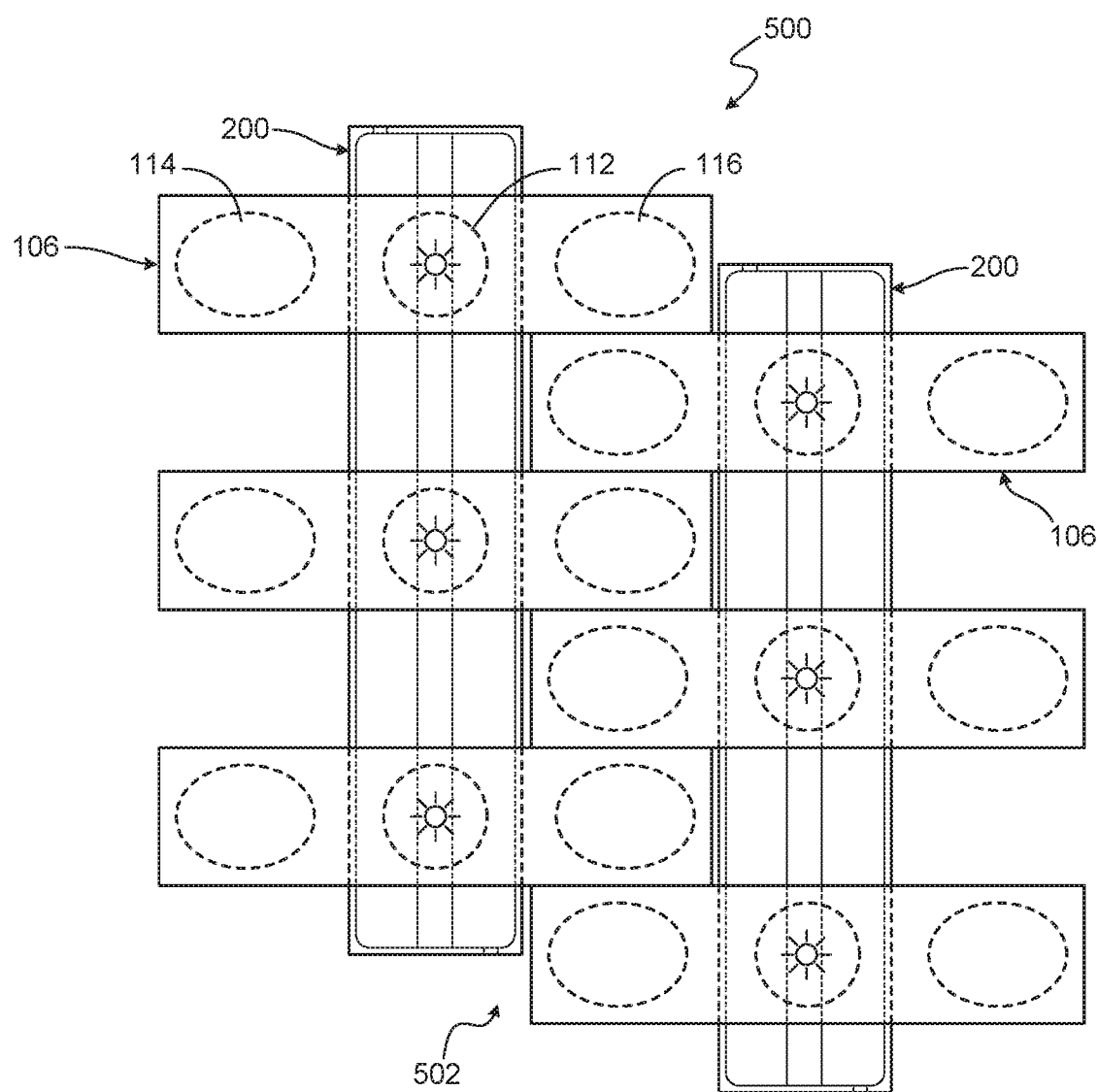
FIG. 5 is a plan view of an example device including sensor modules arranged in a staggered planar tiling pattern.

FIG. 5 shows an example optical sensing device 500 that includes sensor modules 106 arranged in a staggered planar tiling pattern with respect to a planar target 200, such as a microreactor. Features and aspects of the device 500 may be similar or identical to the other devices described herein.

The other devices and systems disclosed herein may be referenced for description not repeated here, with like terminology and/or like reference numerals indicating like components.

Alternate sensor modules 106 of an array 502 are positioned in relative planar alignment with different planar targets 200. The staggered pattern is similar to a brickwork pattern. This allows any suitable number of different targets 200 to be assessed with a compact arrangement of sensor modules 106.

Figure 6:
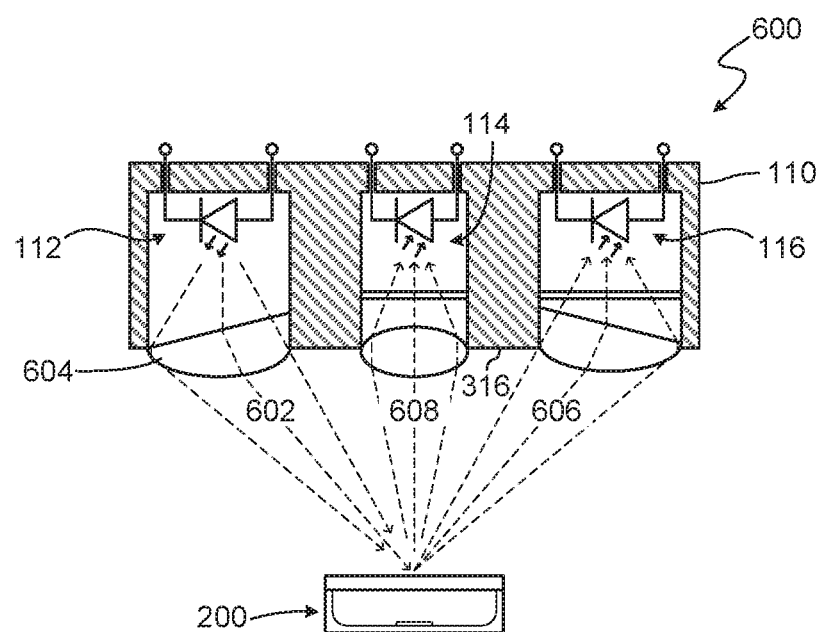
FIG. 6 is a cross-sectional view of an example sensor module with an asymmetrical optical arrangement.

FIG. 6 shows an example sensor module 600 that includes an asymmetrical optical arrangement respect to a planar target 200, such as a microreactor. Features and aspects of the sensor module 600 may be similar or identical to the other devices described herein. The other devices and systems disclosed herein may be referenced for description not repeated here, with like terminology and/or like reference numerals indicating like components A light source 112 is positioned to emit light to the planar target 200 along a source optical path 602 that may include a lens 604 to direct emitted light onto the planar target 200. The source optical path 602 may be at an acute angle with respect to a target-facing boundary 316 of a body 110 that holds the light source 112. That is, the light source 112 may be offset from the central axis of the planar target 200.

Each light sensor 114, 116 senses light received from the planar target 200 along a respective sensor optical path 606, 608 that is non-coincident with the source optical path 602. A sensor optical path 606 may be at an acute angle to the target-facing boundary 316 of the body 110. Another sensor optical path 608 may be normal to the target-facing boundary 316 of the body 110, as compared to the acute optical paths 602, 606. That is, a light sensor 114 may be centrally aligned with the planar target 200.

As discussed elsewhere herein, filters, lenses, and other optical elements may be used to define or further define any of the optical paths 602, 606, 608.

Figure 7:
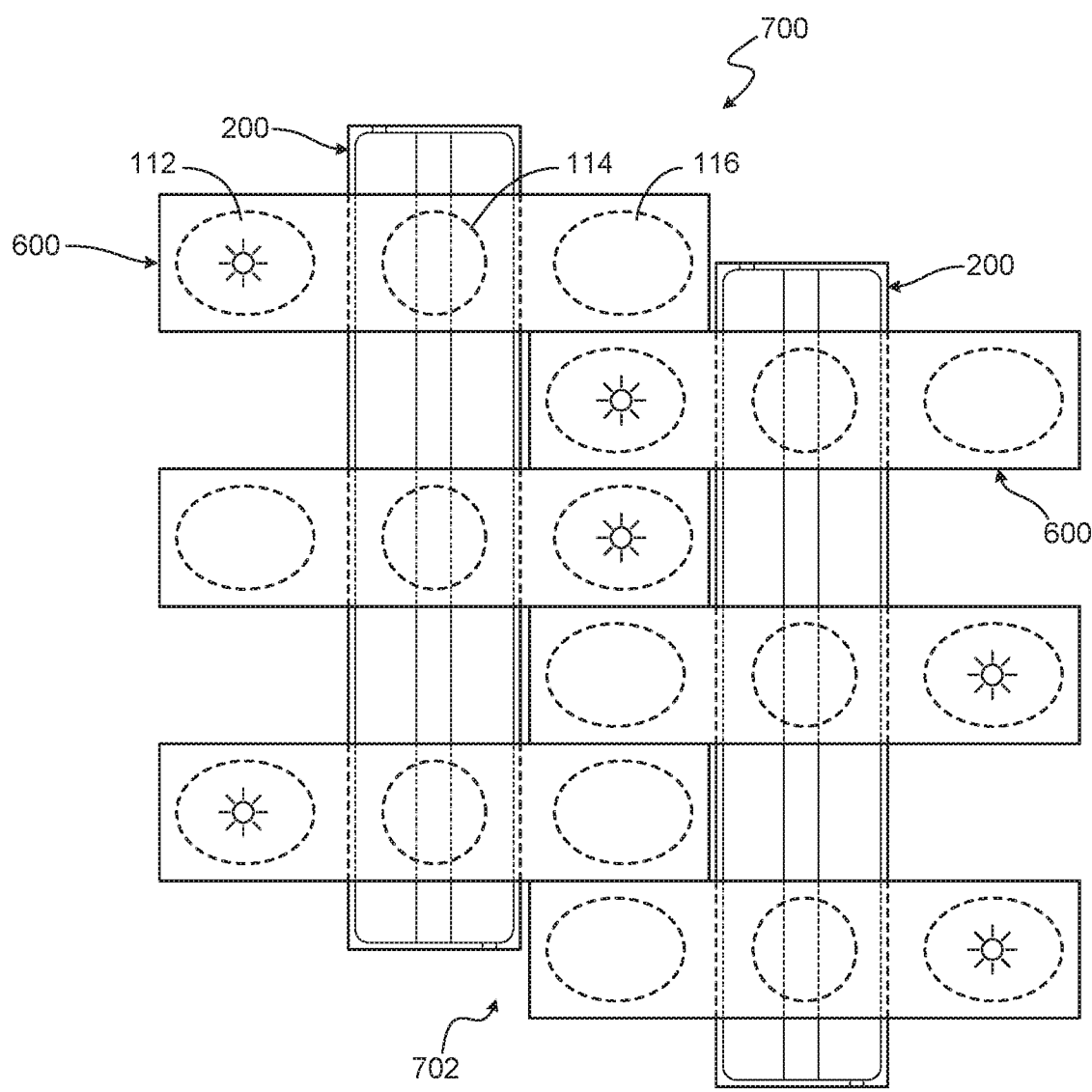
FIG. 7 is a plan view of an example device including asymmetric sensor modules of FIG. 6 arranged in a staggered planar tiling pattern.

As shown in FIG. 7, an optical sensing device 700 may include an array 702 of sensor modules 600 having asymmetric source and sensing light paths arranged in a staggered planar tiling pattern with respect to planar targets 200. A given sensor module 600 may be oriented to position the light source 112 on either side of the respective planar target 200. The sensor modules 600 may have the same orientation or different orientations.

Figure 8:
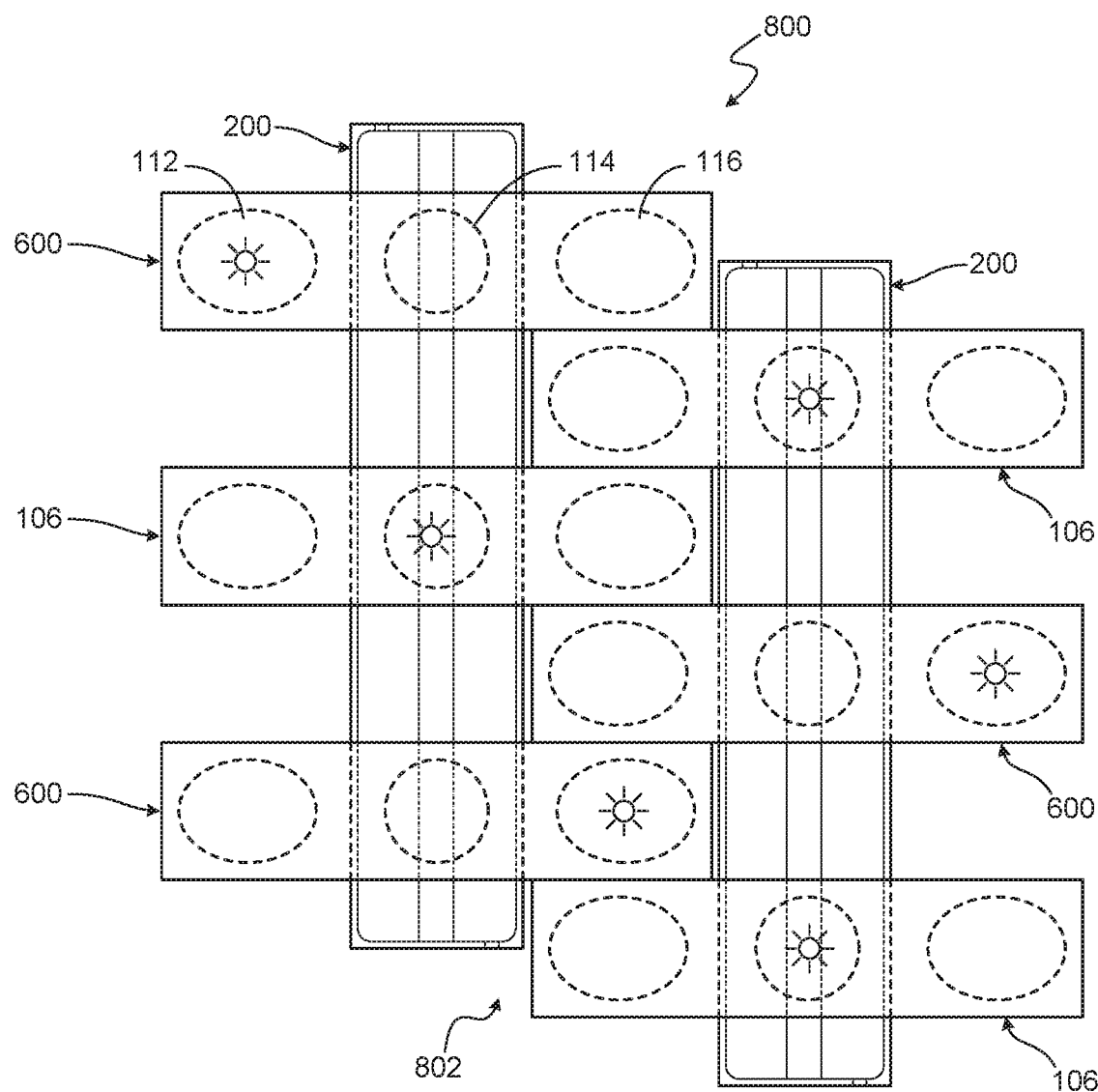
FIG. 8 is a plan view of an example device including symmetric and asymmetric sensor modules arranged in a staggered planar tiling pattern.

As shown in FIG. 8, an optical sensing device 800 may include an array 802 of symmetric and asymmetric sensor modules 106, 600 arranged in a staggered planar tiling pattern with respect to an array of planar targets 200. The symmetric and asymmetric sensor modules 106, 600 may be arranged in any suitable order and orientation.

Figure 9:
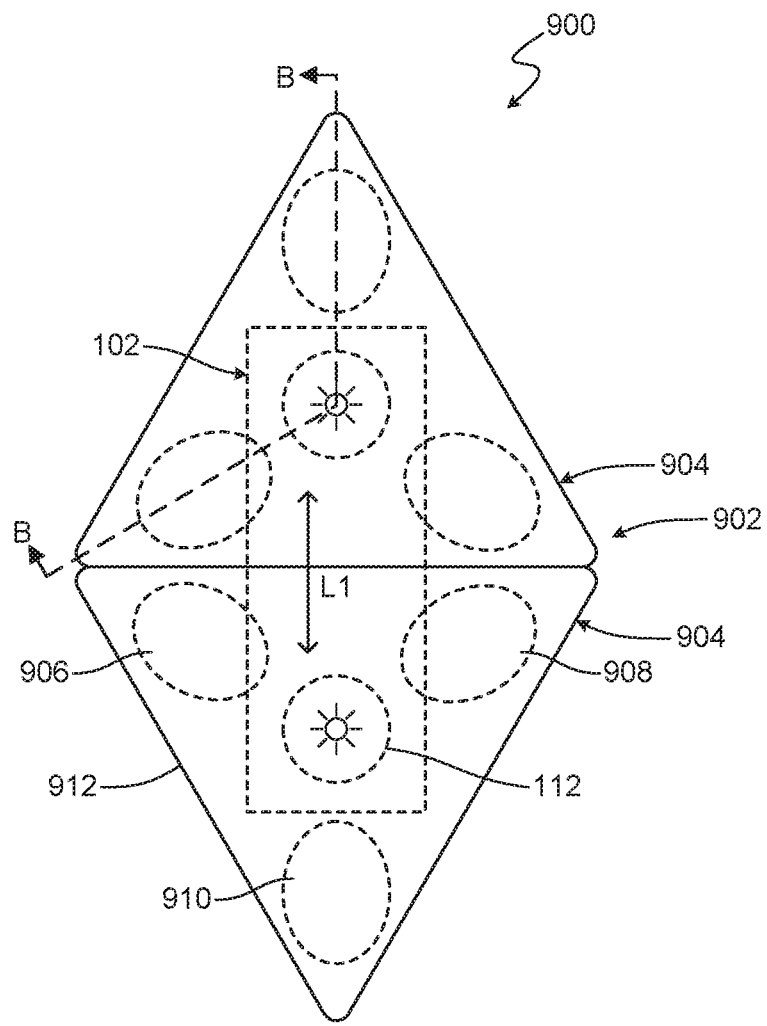
FIG. 9 is a plan view of an example device including triangular sensor modules arranged in a planar tiling pattern.

FIG. 9 shows an example optical sensing device 900 with an array 902 of triangular sensor modules 904 positioned with respect to a planar target 102, such as a microreactor. Features and aspects of the device 900 may be similar or identical to the other devices described herein. The other devices and systems disclosed herein may be referenced for description not repeated here, with like terminology and/or like reference numerals indicating like components.

Each sensor module 904 includes a light source 112 and a plurality of light sensors 906, 908, 910 arranged around the light source 112. In this example, three light sensors 906, 908, 910 are arranged in a regular pattern around the light source 112, such as towards the corners of a triangle with the light source 112 at the center. A section B-B of a sensor module 904 at adjacent light sensors 906, 908, 910 may appear similar to FIG. 3. A perpendicular source optical path and symmetric acute sensor optical paths may allow for excitation and response that is centrally positioned along the planar rectangular target 102.

The light source 112 and sensors 906, 908, 910 may be mutually coupled together by a body 912. The body 912 may be triangular in shape to allow tessellation of a plurality of bodies 912 to provide a compact arrangement of light sources and sensors.

Figure 10:
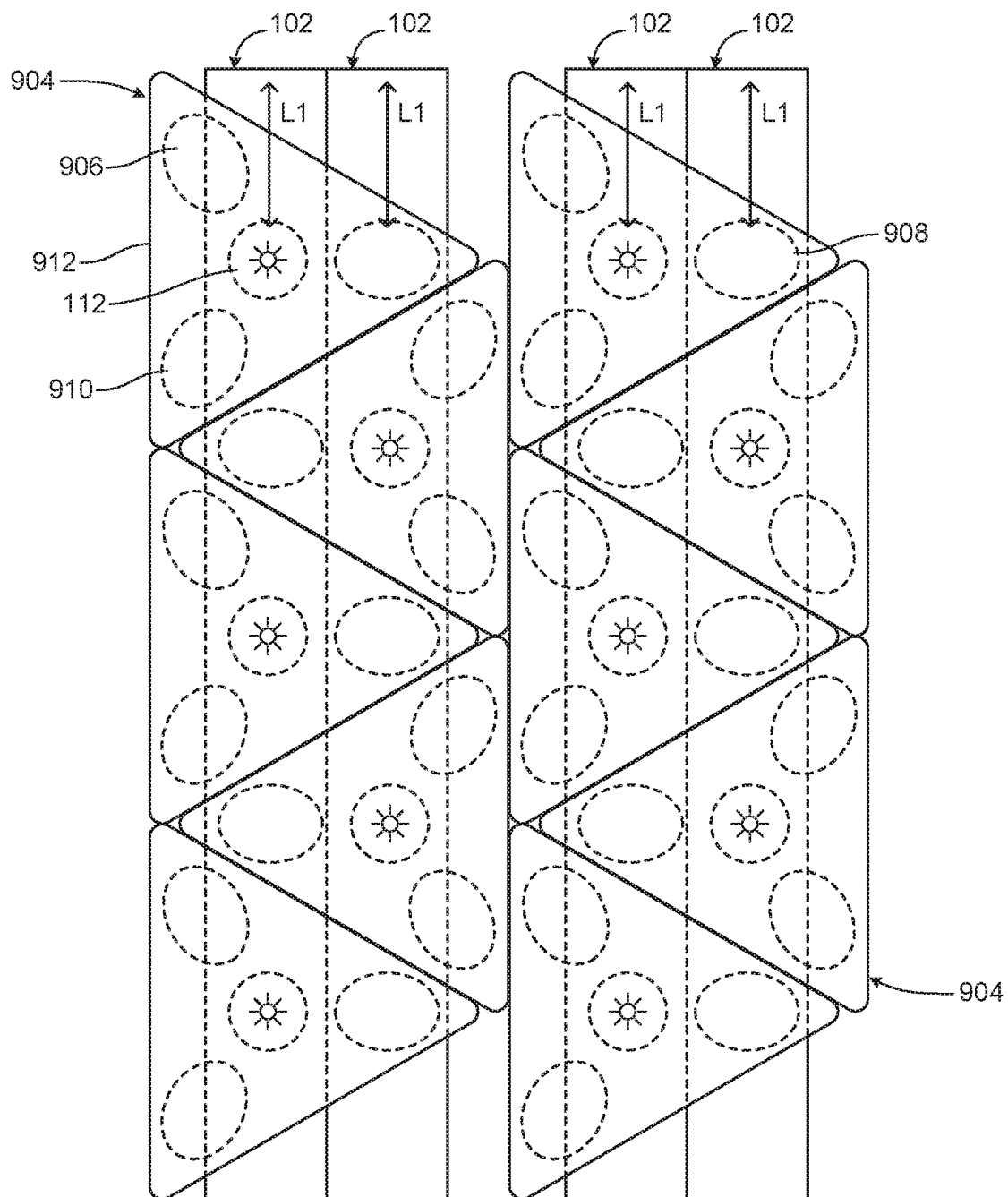
FIG. 10 is a plan view of an example device including triangular sensor modules arranged in a planar tiling pattern with respect to a plurality of planar targets.

As shown in FIG. 10, a plurality of sensor modules 904 may be tessellated to overlie a plurality of elongate rectangular planar targets 102 with increased or maximized spatial efficiency. The planar targets 102 may be arrayed to run parallel to one another. In this example, the light source 112 of each sensor module 904 is centrally aligned with a particular planar target 102. A light sensor 906, 908, 910 may physically overlie a planar target 102 adjacent to the planar target 102 sensed.

Figure 11:
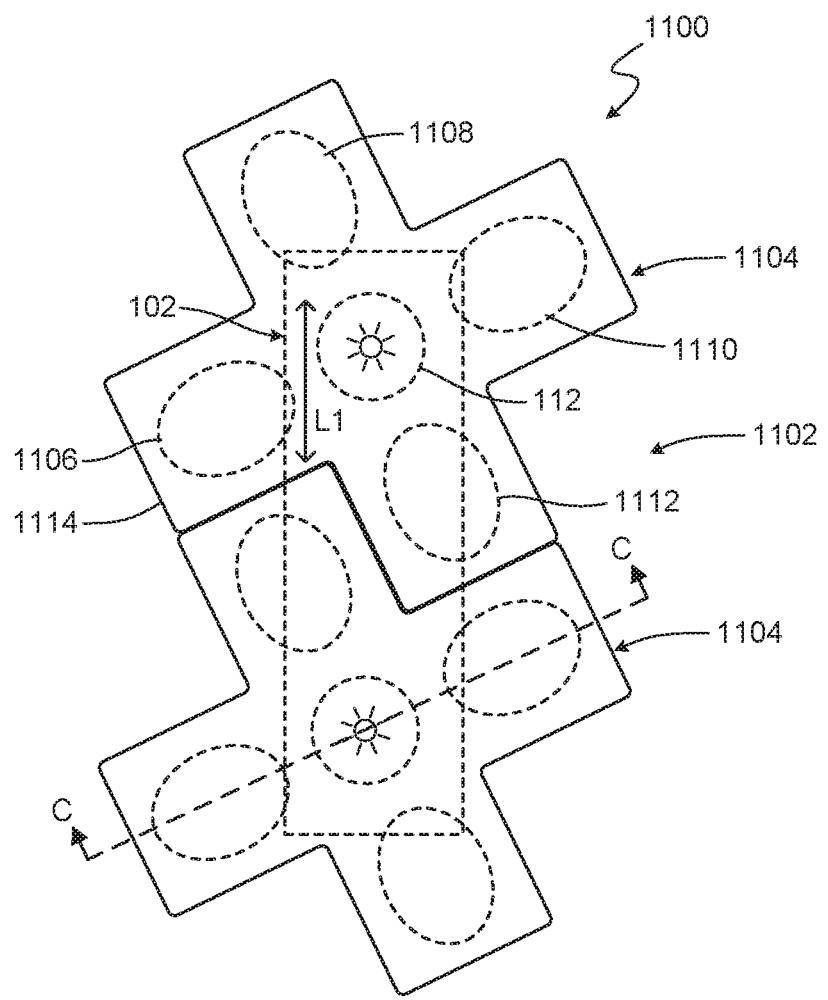
FIG. 11 is a plan view of an example device including cross-shaped sensor modules arranged in a planar tiling pattern.

FIG. 11 shows an example optical sensing device 1100 with an array 1102 of cross-shaped sensor modules 1104 positioned with respect to a planar target 102, such as a microreactor. Features and aspects of the device 1100 may be similar or identical to the other devices described herein. The other devices and systems disclosed herein may be referenced for description not repeated here, with like terminology and/or like reference numerals indicating like components.

Each sensor module 1104 includes a light source 112 and a plurality of light sensors 1106, 1108, 1110, 1112 arranged around the light source 112. In this example, four light sensors 1106, 1108, 1110, 1112 are arranged in a regular pattern around the light source 112, such as at the arms of a cross with the light source 112 at the center. A section C-C of a sensor module 1104 that cuts through opposing pairs of light sensors 1106, 1108, 1110, 1112 may appear similar to FIG. 3. A perpendicular source optical path and symmetric acute sensor optical paths may allow for excitation and response that is centrally positioned along the planar rectangular target 102.

The light source 112 and sensors 1106, 1108, 1110, 1112 may be mutually coupled together by a body 1114. The body 1114 may be cross-shaped to allow tessellation of a plurality of bodies 1114 to provide a compact arrangement of light sources and sensors.

Figure 12:
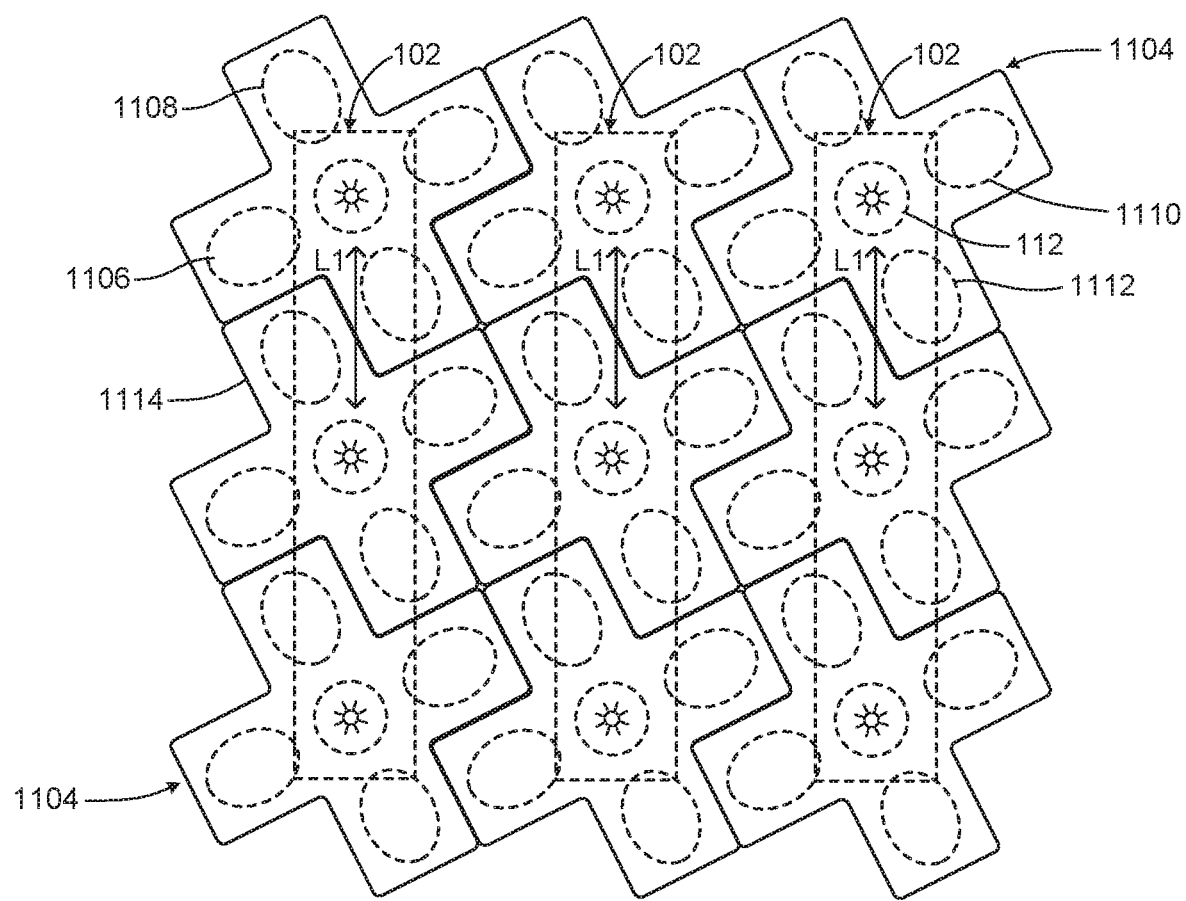
FIG. 12 is a plan view of an example device including cross-shaped sensor modules arranged in a planar tiling pattern with respect to a plurality of planar targets.

As shown in FIG. 12, a plurality of sensor modules 1104 may be tessellated to overlie a plurality of elongate rectangular planar targets 102 with increased or maximized spatial efficiency. The planar targets 102 may be arrayed to run parallel to one another. In this example, the light source 112 of each sensor module 1104 is centrally aligned with a particular planar target 102. A light sensor 1106, 1108, 1110, 1112 may physically overlie a planar target 102 adjacent to the planar target 102 sensed.

Figure 13:
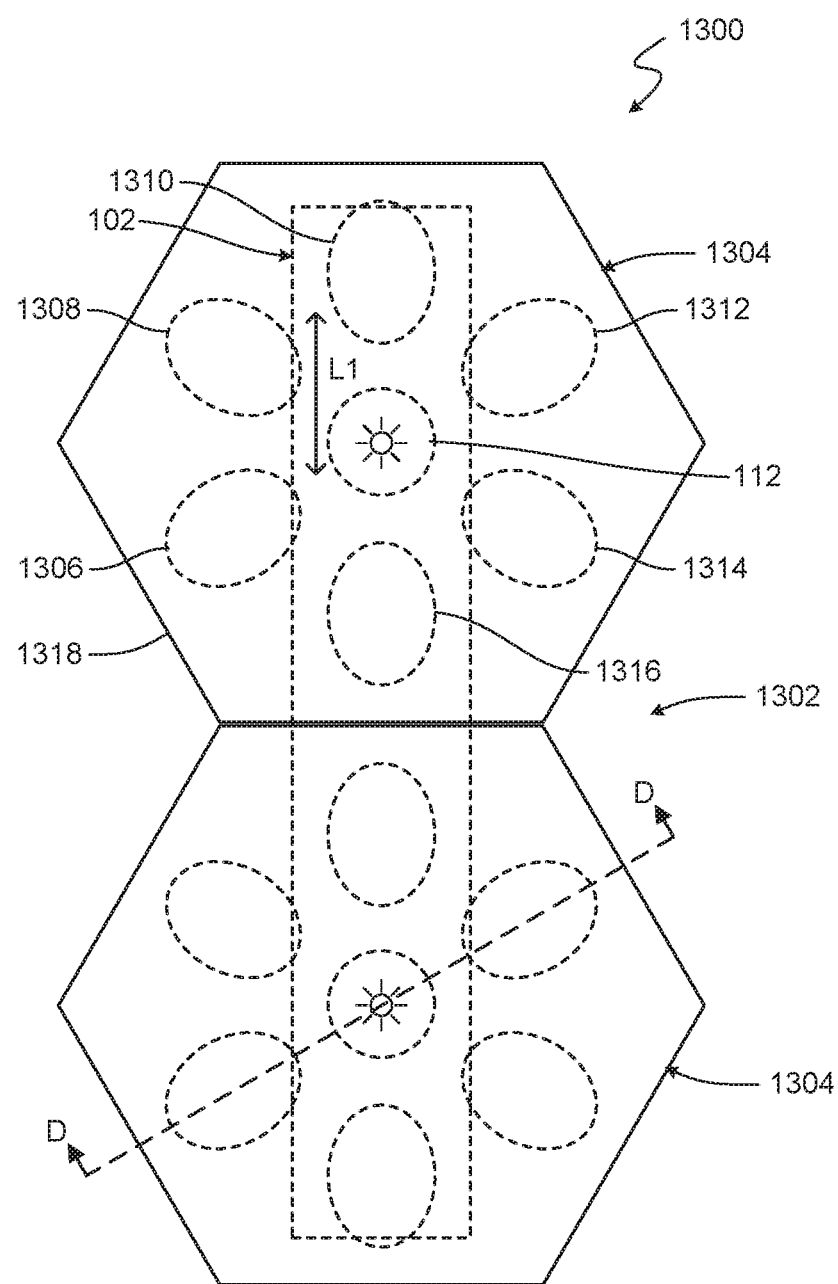
FIG. 13 is a plan view of an example device including hexagonal sensor modules arranged in a planar tiling pattern.

FIG. 13 shows an example optical sensing device 1300 with an array 1302 of hexagonal sensor modules 1304 positioned with respect to a planar target 102, such as a microreactor. Features and aspects of the device 1300 may be similar or identical to the other devices described herein. The other devices and systems disclosed herein may be referenced for description not repeated here, with like terminology and/or like reference numerals indicating like components.

Each sensor module 1304 includes a light source 112 and a plurality of light sensors 1306, 1308, 1310, 1312, 1314, 1316 arranged around the light source 112. In this example, six light sensors 1306, 1308, 1310, 1312, 1314, 1316 are arranged in a regular pattern around the light source 112, such as towards the sides of a hexagon with the light source 112 at the center. A section D-D of a sensor module 1304 that cuts through opposing pairs of light sensors 1306, 1308, 1310, 1312, 1314, 1316 may appear similar to FIG. 3. A perpendicular source optical path and symmetric acute sensor optical paths may allow for excitation and response that is centrally positioned along the planar rectangular target 102.

The light source 112 and sensors 1306, 1308, 1310, 1312, 1314, 1316 may be mutually coupled together by a body 1318. The body 1318 may be in the shape of a hexagon to allow tessellation of a plurality of bodies 1318 to provide a compact arrangement of light sources and sensors.

Figure 14:
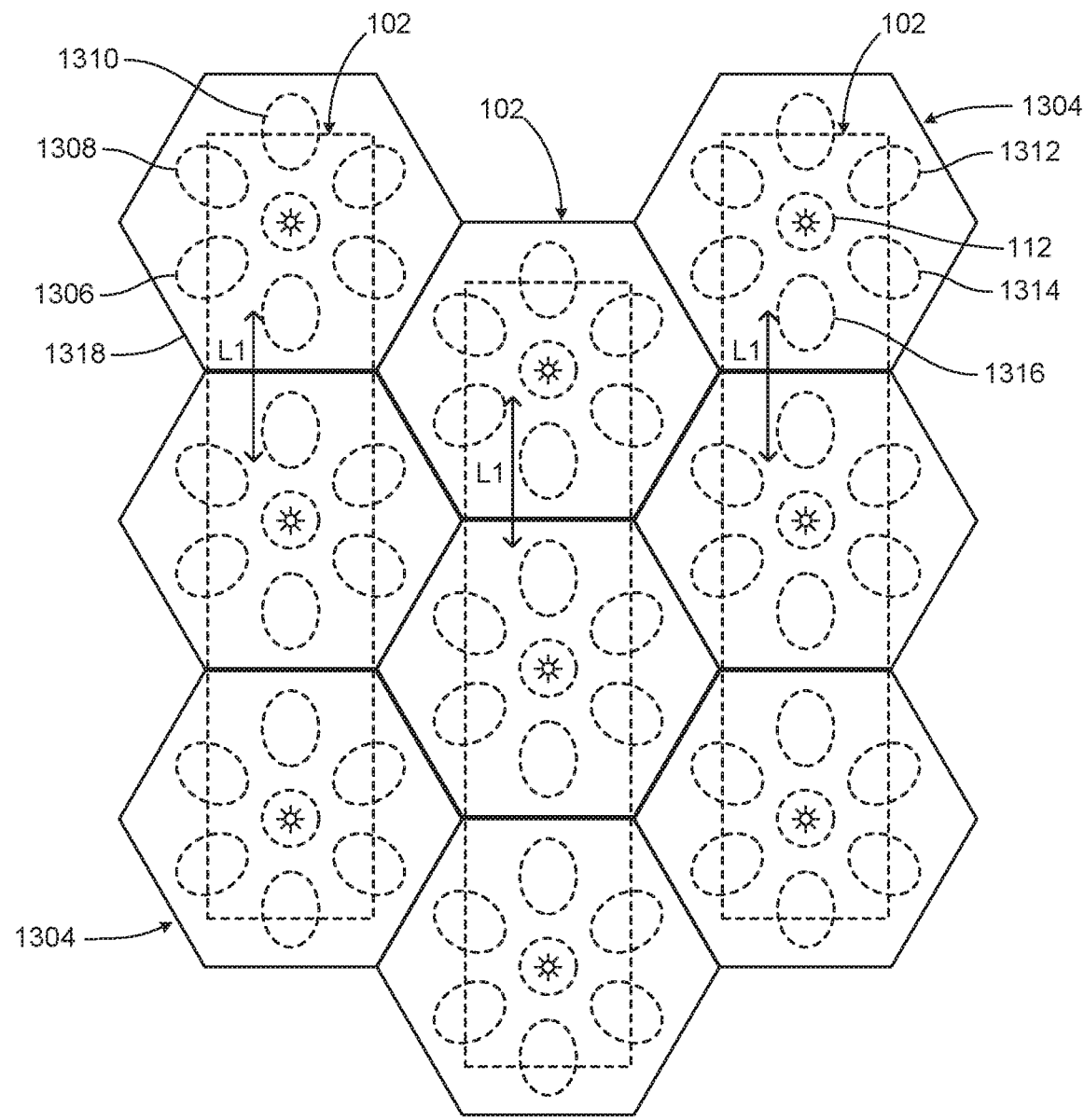
FIG. 14 is a plan view of an example device including hexagonal sensor modules arranged in a planar tiling pattern with respect to a plurality of planar targets.

As shown in FIG. 14, a plurality of sensor modules 1304 may be tessellated to overlie a plurality of elongate rectangular planar targets 102 with increased or maximized spatial efficiency. The planar targets 102 may be arrayed to run parallel to one another. In this example, the light source 112 of each sensor module 1304 is centrally aligned with a particular planar target 102. A light sensor 1306, 1308, 1310, 1312, 1314, 1316 may physically overlie a planar target 102 adjacent to the planar target 102 sensed.

Figure 15:
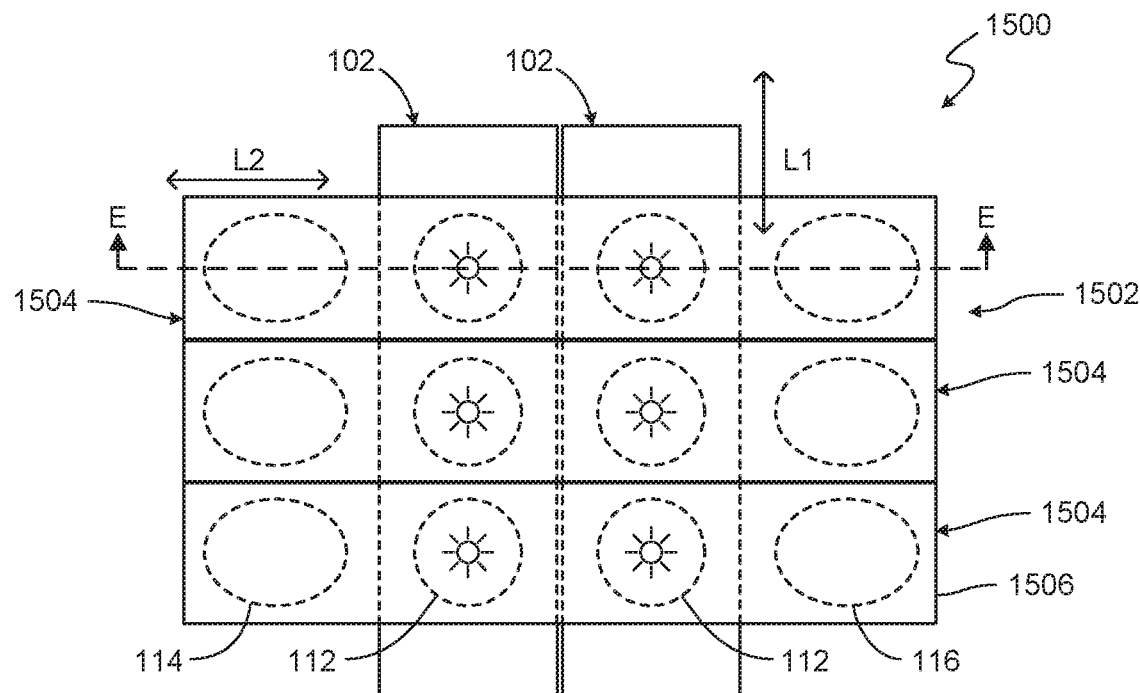
FIG. 15 is a plan view of an example device including sensor modules arranged in a planar tiling pattern, the sensor modules including multiple symmetric light sources.
Figure 16:
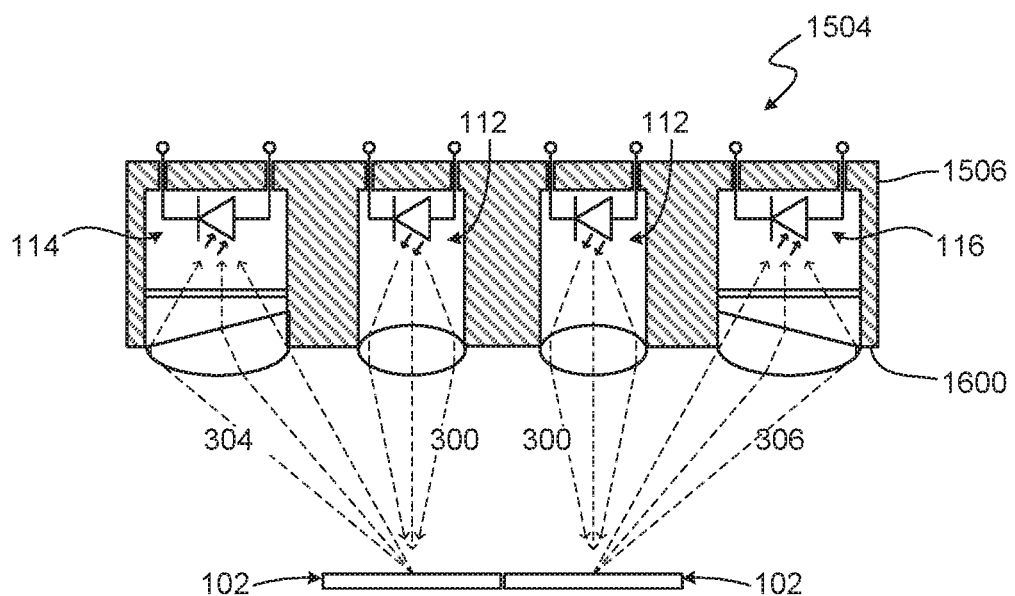
FIG. 16 is a cross-sectional view taken at section line E-E of an example sensor module of FIG. 15.

FIGS. 15 and 16 show an example optical sensing device 1500 with an array 1502 of sensor modules 1504, in which a sensor module 1504 includes multiple symmetric light sources. Features and aspects of the device 1500 may be similar or identical to the other devices described herein. The other devices and systems disclosed herein may be referenced for description not repeated here, with like terminology and/or like reference numerals indicating like components.

A sensor module 1504 includes a plurality of light sources 112. The light sources 112 may be adjacent and central to a body 1506 of the sensor module, with a plurality of sensors 114, 116 at outward extents of the body 1506. Each light source 112 may be aligned with a respective planar target 102 of a plurality of planar targets 102.

The light sources 112 may be positioned to define respective source optical paths 300 extending perpendicular to a target-facing surface 1600 of the body 1506. The light sensors 114, 116 may be positioned to define respective sensor optical paths 304, 306 at an acute angle with respect to the target-facing surface 1600. The positions of the light sources 112 and light sensors 114, 116 may be swapped, so that the optical paths 300, 304, 306 are reversed.

As discussed elsewhere herein, filters, lenses, and other optical elements may be used to define or further define any of the optical paths 300, 304, 306.

Figure 17:
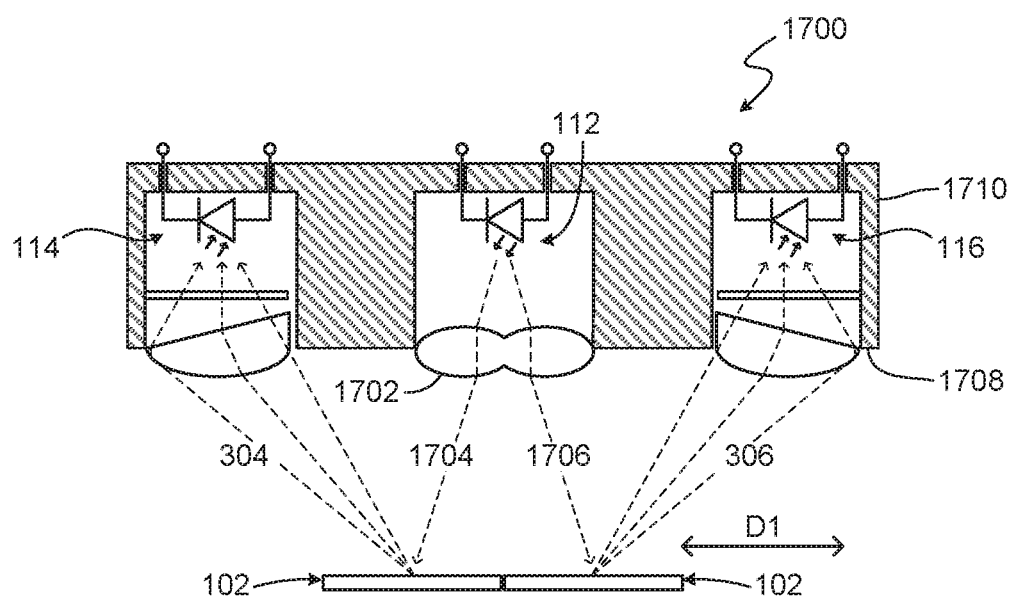
FIG. 17 is a cross-sectional view of an example sensor module with illumination optics to illuminate multiple targets.

FIG. 17 shows an example sensor module 1700 with illumination optics to illuminate multiple targets 102. Features and aspects of the device 1700 may be similar or identical to the other devices described herein. The other devices and systems disclosed herein may be referenced for description not repeated here, with like terminology and/or like reference numerals indicating like components.

The sensor module 1700 includes a light source 112 and an optical element 1702 that splits or diffuses light emitted by the light source 112 to direct light to multiple planar targets 102 that may be arranged with narrow widths in a direction D1. Each planar target 102 may receive light via a respective light source optical path 1704, 1706 that is at an acute angle with respect to a target-facing surface 1708 of a body 1710 of the sensor module 1700.

The optical element 1702 may include a compound lens, Fresnel lens, diffractive element, holographic element, or similar.

The light sensors 114, 116 may be positioned to define respective sensor optical paths 304, 306 at an acute angle with respect to the target-facing surface 1708. As discussed elsewhere herein, filters, lenses, and other optical elements may be used to define or further define any of the optical paths 304, 306, 1704, 1706.

Figure 18:
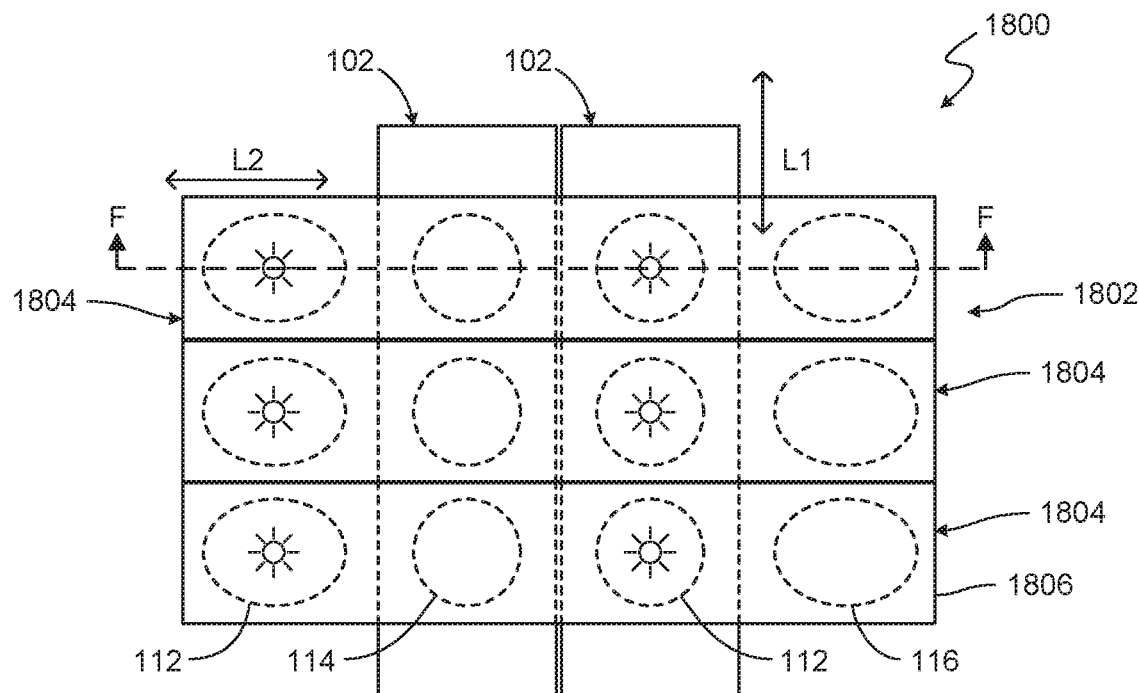
FIG. 18 is a plan view of an example device including sensor modules arranged in a planar tiling pattern, the sensor modules including multiple asymmetric light sources.
Figure 19:
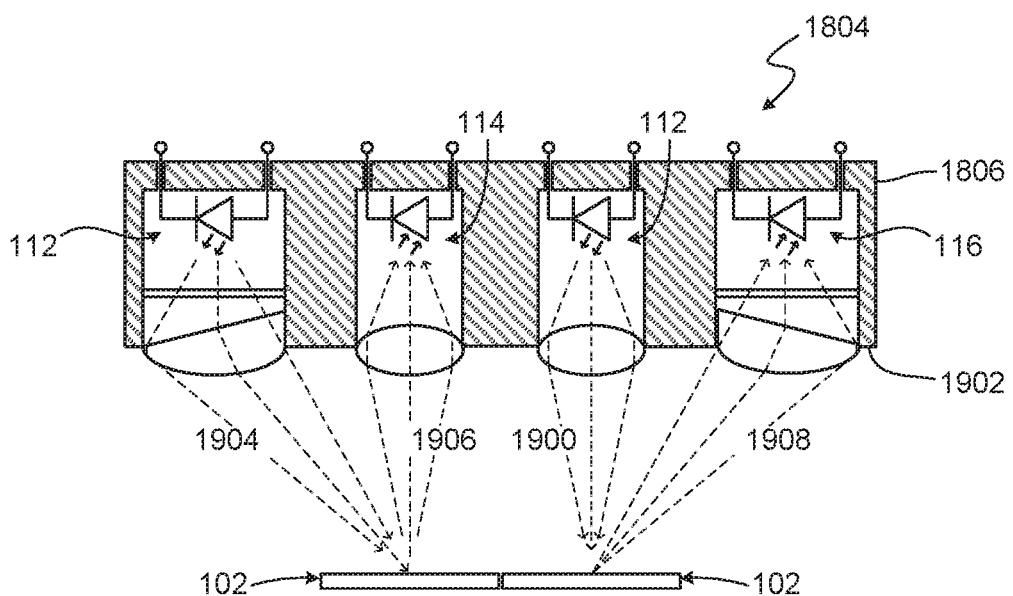
FIG. 19 is a cross-sectional view taken at section line E-E of an example sensor module of FIG. 18.

FIGS. 18 and 19 show an example optical sensing device 1800 with an array 1802 of sensor modules 1804, in which a sensor module 1804 includes multiple asymmetric light sources. Features and aspects of the device 1800 may be similar or identical to the other devices described herein. The other devices and systems disclosed herein may be referenced for description not repeated here, with like terminology and/or like reference numerals indicating like components.

A sensor module 1804 includes a plurality of light sources 112 secured to a body 1806. Each light source 112 may be positioned to emit light to a respective planar target 102 of a plurality of planar targets 102.

A light source 112 may be positioned to define a respective source optical path 1900 extending perpendicular to a target-facing surface 1902 of the body 1806. Another light source 112 may be positioned to define a respective source optical path 1904 extending at an acute angle with respect to a target-facing surface 1902 of the body 1806.

The light sensors 114, 116 may be positioned to define respective sensor optical paths 1906, 1908, which may be respectively normal and acute with respect to the target-facing surface 1902 of the body 1806. The positions of the light sources 112 and light sensors 114, 116 may be interchanged.

As discussed elsewhere herein, filters, lenses, and other optical elements may be used to define or further define any of the optical paths 1900, 1904, 1906, 1908.

Figure 20:
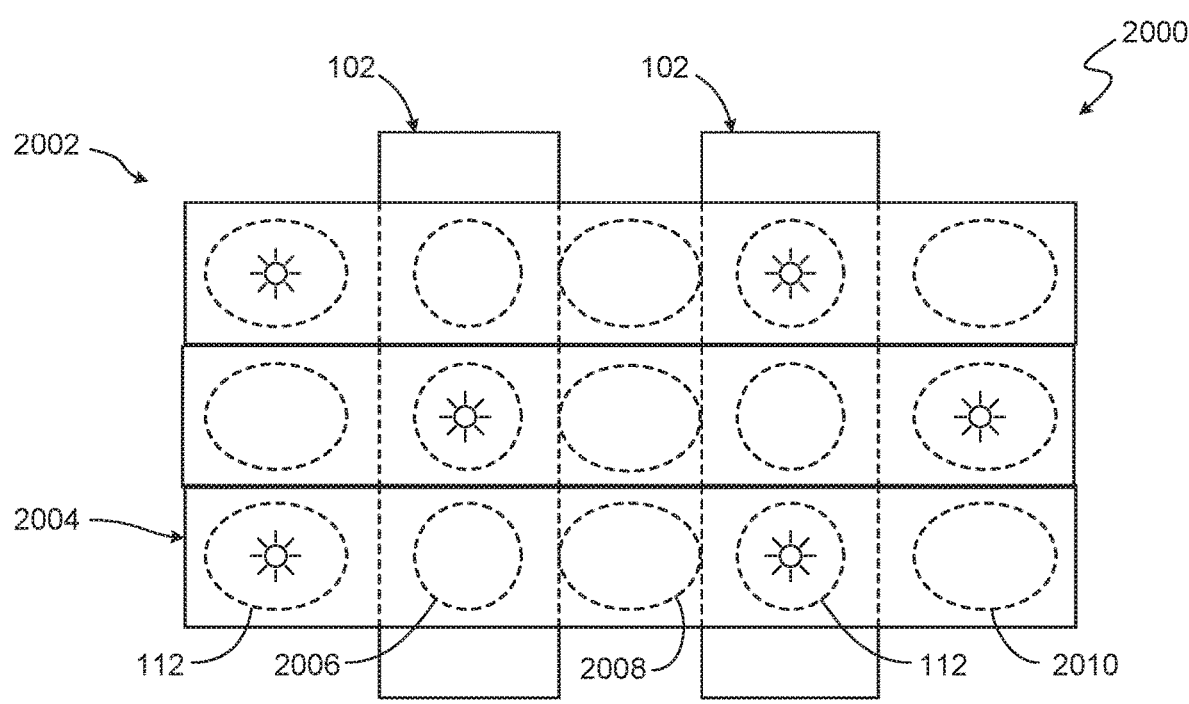
FIG. 20 is a plan view of an example device including sensor modules arranged in a planar tiling pattern, the sensor modules including multiple asymmetric light sources.

FIG. 20 shows an example optical sensing device 2000 with an array 2002 of asymmetric sensor modules 2004. Features and aspects of the device 2000 may be similar or identical to the other devices described herein. The other devices and systems disclosed herein may be referenced for description not repeated here, with like terminology and/or like reference numerals indicating like components.

A sensor module 2004 may include a light source 112 associated with a first set of light sensors 2006, 2008 and a second light source 112 associated with a second set of light sensors. 2014. The first set of light sensors 2006, 2008 may be aligned with a first planar target 102 to assess the target 102. The second set of light sensors 2010 may be aligned with a second planar target 102 to assess the target 102. Any number of light sources and light sensors may be provided to a set. A light source may be positioned to emit light at a normal or acute angle with respect to the body of the sensor module 2004. A light sensor may be positioned to capture light at a normal or acute angle with respect to the body of the sensor module 2004.

In examples described herein, a system includes a fluorescence detector including an array of sensor modules arranged in a planar tiling pattern with respect a longitudinal axis of a receptacle. Each sensor module includes a body of a tileable shape, a light source coupled to the body, and a plurality of light sensors coupled to the body. The plurality of light sensors is to sense different wavelengths of light. The plurality of light sensors and the light source have different optical paths between the body and the receptacle. The system further includes a cartridge carrying a planar target. The cartridge is removably insertable into the receptacle. The planar target includes a reaction chamber and a heater for a nucleic acid amplification process. The array of sensor modules is to align with a longitudinal axis of the reaction chamber to sense fluorescence signals of the nucleic acid amplification process.

In examples described herein, a system includes a fluorescence detector including an array of sensor modules arranged in a planar tiling pattern with respect a longitudinal axis of a receptacle. Each sensor module includes a body of a tileable shape, a light source coupled to the body, and a plurality of light sensors coupled to the body. The plurality of light sensors is to sense different wavelengths of light. The plurality of light sensors and the light source have different optical paths between the body and the receptacle. The system further includes a cartridge carrying a planar target. The cartridge is removably insertable into the receptacle. The planar target includes a chamber for a biological, chemical, or biochemical process, such as an immunoassay. The array of sensor modules is to align with a longitudinal axis of the reaction chamber to sense light signals, such as fluorescence, of the process.

Figure 21:
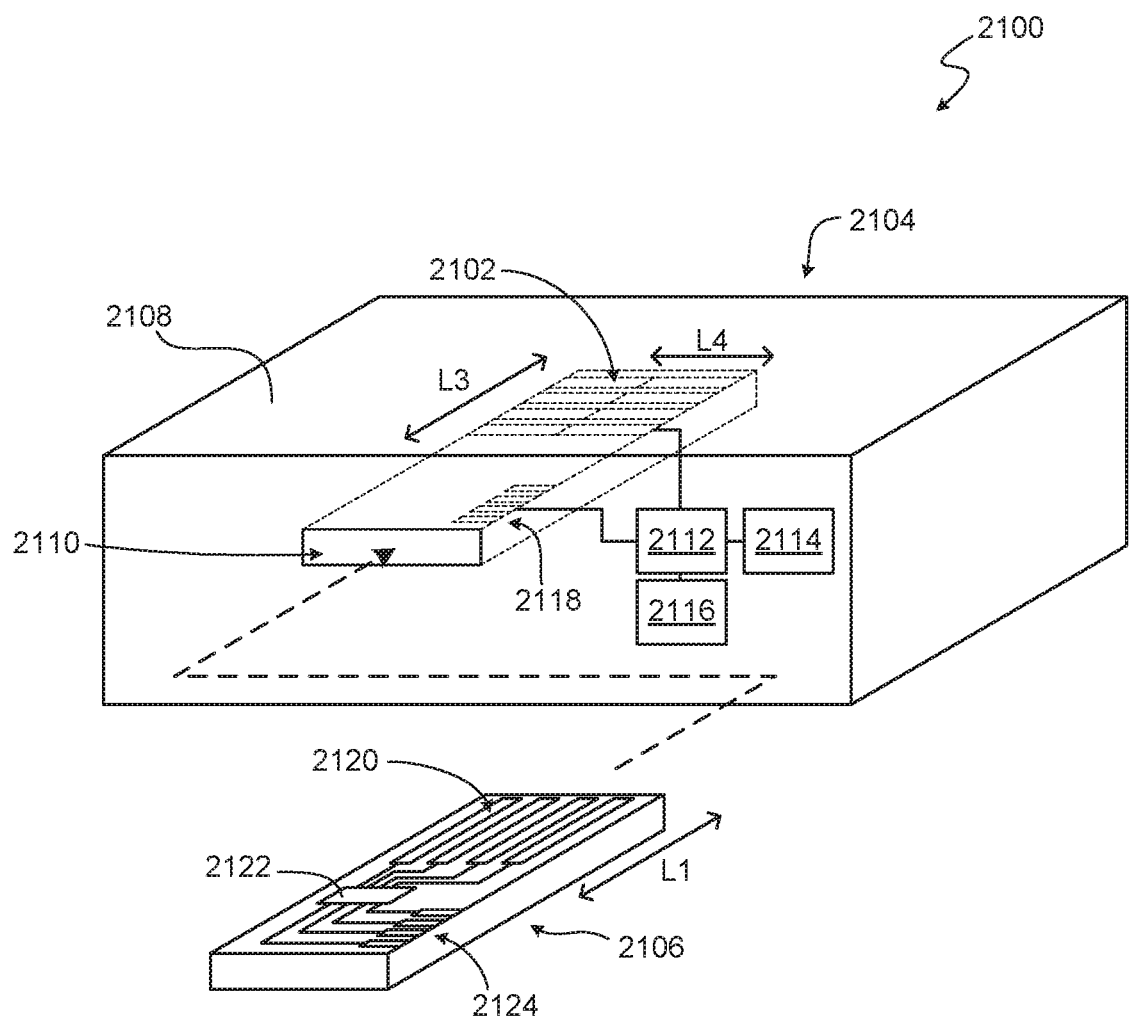
FIG. 21 is a perspective view of an example system that includes a fluorescence detector including an array of sensor modules arranged in a planar tiling pattern.

FIG. 21 shows an example optical sensing system 2100 with an array 2102 sensor modules. Features and aspects of the system 2100 may be as described with respect to the optical sensing devices and sensor modules described herein. Such description may be referenced for matter not repeated here, with like terminology and/or like reference numerals indicating like components.

The system 2100 includes a fluorescence detector 2104 and a cartridge 2106. The cartridge 2106 may be configured to perform a PCR or similar process. Any number of different cartridges 2106 may be used with a fluorescence detector 2104.

The fluorescence detector 2104 includes a housing 2108, a receptacle 2110 in the housing 2108, and an array 2102 of sensor modules within the receptacle 2110. The fluorescence detector 2104 may further include a processor 2112, memory 2114 connected to the processor 2112, and an interface device 2116, such as a user interface device (e.g., display, keyboard, touchscreen, etc.) to allow user interaction with the fluorescence detector 2104, a network interface device to allow the fluorescence detector 2104 to communicate information with a computer network, or similar.

The receptacle 2110 is shaped and sized to removably receive the cartridge 2106.

The array 2102 of sensor modules arranged in a planar tiling pattern or tessellation, as discussed elsewhere herein. The array 2102 of sensor modules may be arranged with respect a longitudinal axis L3 of the receptacle 2110. That is, the planar tiling pattern or tessellation may extend along the longitudinal axis L3 of the receptacle 2110, so as to align with the longitudinal axis L1 of a planar target on the cartridge 2106. The planar tiling pattern or tessellation may extend along a width L4 of the receptacle 2110 to span a width of the planar target on the cartridge 2106.

Each sensor module of the array 2102 may be as described elsewhere herein, with a light source and light sensor.

The processor 2112 may include a central processing unit (CPU), a microcontroller, a microprocessor, a processing core, a field-programmable gate array (FPGA), or a similar device capable of executing instructions. The processor 2112 may cooperate with the memory 2114 to execute instructions that may be stored in the memory 2114. The memory 2114 may include a non-transitory machine-readable medium that may be an electronic, magnetic, optical, or other physical storage device that encodes executable instructions. The machine-readable medium may include, for example, random access memory (RAM), read-only memory (ROM), electrically-erasable programmable read-only memory (EEPROM), flash memory, a storage drive, an optical disc, or similar.

The processor 2112 may be electrically connected to the array 2102 of sensor modules to control the light sources and sensors thereof. The processor 2112 may further be electrically connected to electrical contacts 2118 within the receptacle 2110 to interface with the cartridge 2106.

The cartridge 2106 carries a planar target 2120 that extends along a longitudinal axis L1, such as any of the planar targets described herein. An array of planar targets 2120 may be provided. The planar target 2120 includes a reaction chamber and a heater for a nucleic acid amplification process, such as PCR, qPCR, or similar process.

The cartridge 2106 may further include a circuit 2122 to control operation of the planar target 2120, such as to control a heater or active microfluidic component, such as a pump. The cartridge 2106 may further include electrical contacts 2124 to electrically connect to the electrical contacts 2118 within the receptacle 2110 to communicate power and signal with the fluorescence detector 2104.

The cartridge 2106 is removably insertable into the receptacle 2110. When the cartridge 2106 is inserted, the array 2102 of sensor modules becomes aligned with a longitudinal axis L1 of the planar target 2120, so that fluorescence signals of the nucleic acid amplification process carried out at the planar target 2120 may be detected.

In examples described herein, a method includes forming a plurality of sensor modules by forming a body of a tileable shape, coupling a light source to the body, and coupling a plurality of light sensors to the body. The plurality of light sensors sense different wavelengths of light. The plurality of light sensors and the light source have different optical paths extending to or from the body. The method further includes mutually affixing the plurality of sensor modules in a planar tiling pattern.

The method may further include forming a resource of different sensor modules including light sources and light sensors of different wavelength combinations, and selecting the plurality of sensor modules according to expected fluorescence signals of a polymerase chain reaction.

Figure 22:
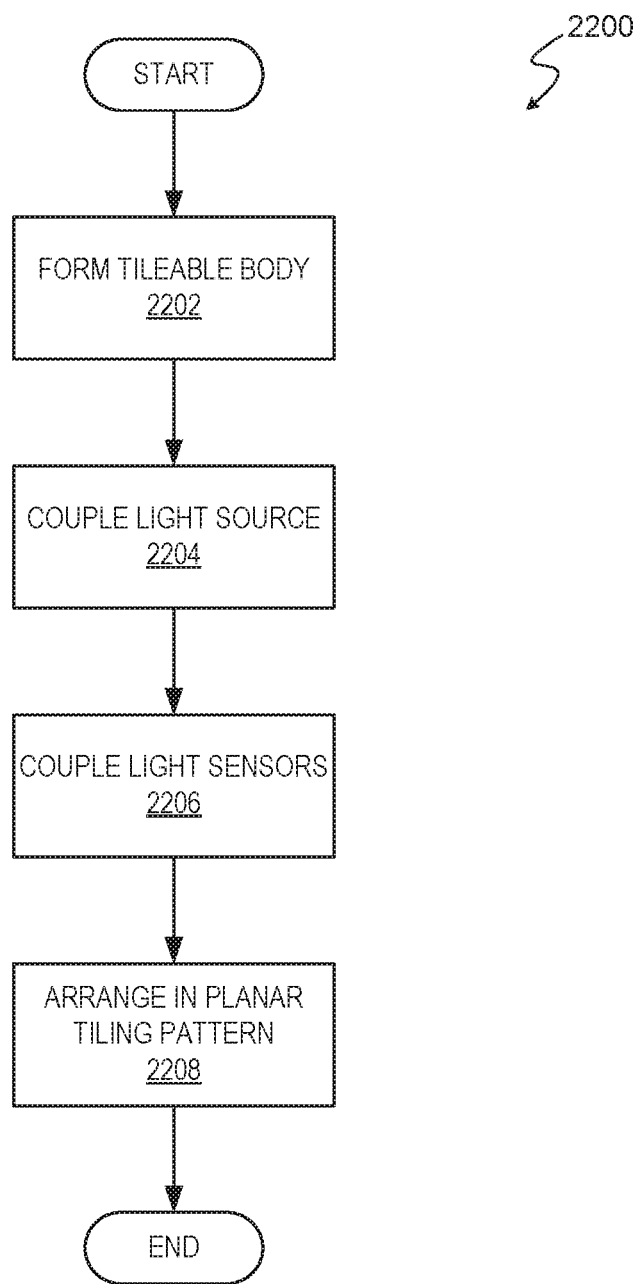
FIG. 22 is a flowchart of an example method of manufacturing an optical sensing device.

FIG. 22 shows an example method 2200 of making an optical sensing device. The method 2200 may be used to manufacture any of the optical sensing devices described herein.

At block 2202, a body of a tileable shape is formed. The body may be formed from a silicon substrate or a substrate of anther material.

A light source, such as an LED, is coupled to the body, at block 2204. The light source may be formed separately and then attached to the body. Alternatively, the light source may be deposited directly on the substrate that forms the body using semiconductor manufacturing techniques.

At block 2206, light sensors, such as photodiodes, are coupled to the body. The light sensors may be selected to sense different wavelengths of light. The light sensors may be formed separately and then attached to the body. Alternatively, the light sensors may be deposited directly onto the substrate that forms the body using semiconductor manufacturing techniques. The light sensors and the light source are relatively positioned and oriented to have different optical paths.

Blocks 2202, 2204, 2206 are repeated to form a plurality of sensor modules. The sensor modules may have different emitting and/or sensing wavelengths.

Then, at block 2208, the sensor modules are mutually affixed in a planar tiling pattern, such as the patterns or tessellations discussed elsewhere herein, to form an optical sensing device. The tilable bodies of the sensor modules are arranged into a space efficient pattern.

Figure 23:
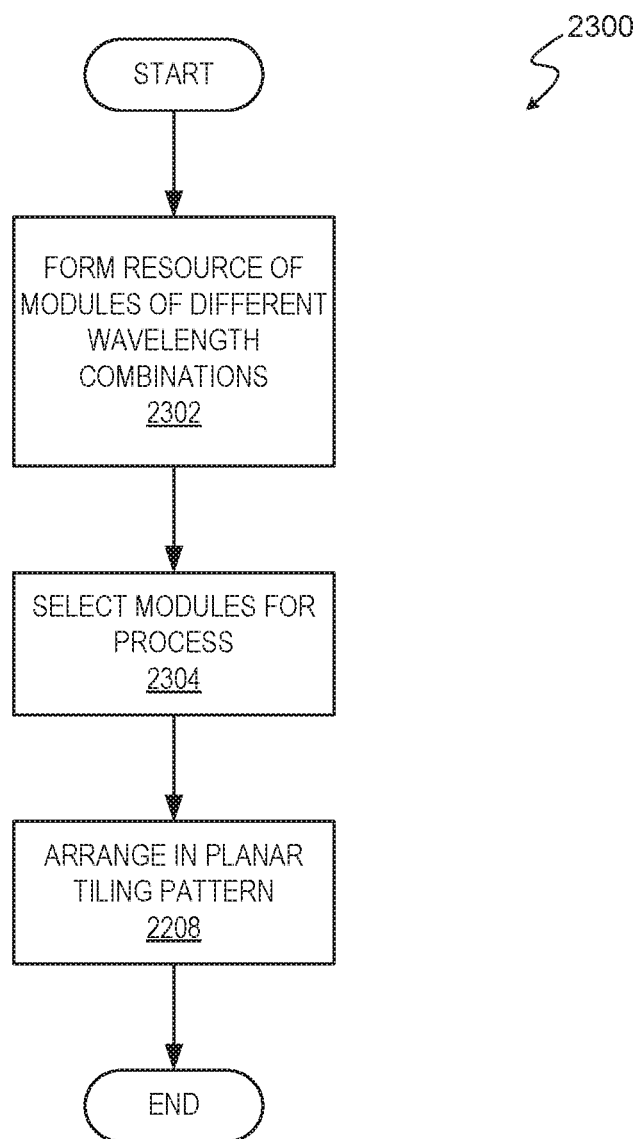
FIG. 23 is a flowchart of an example method of manufacturing an optical sensing device using a resource of different sensor modules.

FIG. 23 shows an example method 2300 of making an optical sensing device using a resource of different sensor modules. The method 2300 may be used to manufacture any of the optical sensing devices described herein.

At block 2302, a resource or library of different sensor modules is formed. The sensor modules are sensitive to different wavelength combinations and accordingly include various combination of light sources, light sensors, filters, and the like.

At block 2304, sensor modules are selected from the resource based on a specification for a process to measure or monitor. For example, sensor modules may be selected based on expected fluorescence signals of a PCR.

Then, at block 2208, the purpose selected sensor modules are mutually affixed in a planar tiling pattern, such as the patterns or tessellations discussed elsewhere herein.

As should be apparent from the above detailed description, modular light-emitting and light-sensing modules may be shaped to fit in a tiling pattern. An array of modules may be configured to fit a process to be monitored or analyzed, such as a process performed at a planar target (e.g., a microfluidic reaction chamber). An array of modules may be compact, which may allow high-density sensing at a small substrate, such as a sliver of silicon. An array of such modules may be suitable for microfluidic NAT application, in which small amounts of fluid (e.g., picolitre or microliter volumes) may require sensitivity to different wavelengths. The complexity of a device having an array of such modules is reduced due to the similarly in the modules and their like shapes. Such arrays are also highly scalable, with not additional optical design required, as the tiling pattern may be extended within the plane. Further, the resulting device may be solid state and have no significant moving parts.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A device comprising:
   an array of sensor modules, a sensor module including:
      a body to be positioned in alignment with a planar target;
      a light source coupled to the body to emit light to the planar target along a source optical path; and
      a plurality of light sensors coupled to the body, each light sensor to sense a different wavelength of light received from the planar target along a sensor optical path, wherein the sensor optical path is different from the source optical path;
   wherein the bodies of the array of sensor modules are arranged in a planar tiling pattern with respect to a longitudinal axis of the planar target.

2. The device of claim 1, wherein the planar tiling pattern comprises a staggered arrangement, in which alternate sensor modules of the array of sensor modules are to be positioned in relative planar alignment with different planar targets that include the planar target.

3. The device of claim 1, wherein the planar target is rectangular and the body of each sensor module is rectangular, and wherein the planar tiling pattern comprises the body being in longitudinal alignment with the planar target.

4. The device of claim 1, wherein the planar target is rectangular and the body of each sensor module is rectangular, and wherein the planar tiling pattern comprises the body being orthogonal with the planar target.

5. The device of claim 1, wherein the array of sensor modules is to be positioned in alignment with a plurality of planar targets that includes the planar target.

6. The device of claim 1, wherein the planar tiling pattern comprises a regular tessellated pattern.

7. The device of claim 1, wherein, in a sensor module of the array of sensor modules, the source optical path is normal to the body and the sensor optical path is at an acute angle to the body.

8. The device of claim 1, wherein, in a sensor module of the array of sensor modules, the source optical path is at an acute angle to the body and the sensor optical path is normal to the body.

9. The device of claim 1, wherein the plurality of light sensors is arranged in a regular pattern around the light source, wherein the plurality of light sensors is equidistant to the light source.

10. The device of claim 1, wherein, in a sensor module of the array of sensor modules, filters for different wavelengths are positioned in the sensor optical path of each light sensor of the plurality of light sensors.

11. The device of claim 1, wherein a sensor module of the array of sensor modules comprises a plurality of light sources.

12. The device of claim 1, wherein the planar target comprises a reaction chamber and a heater for a polymerase chain reaction, wherein the light source and the plurality of light sensors are selected according to expected fluorescence signals of the polymerase chain reaction.

13. A method comprising:
   forming a plurality of sensor modules by:
      forming a body of a tileable shape;
      coupling a light source to the body; and
      coupling a plurality of light sensors to the body, the plurality of light sensors to sense different wavelengths of light, wherein the plurality of light sensors and the light source have different optical paths extending to or from the body;
   mutually affixing the plurality of sensor modules in a planar tiling pattern.

14. The method of claim 13, further comprising:
   forming a resource of different sensor modules including light sources and light sensors of different wavelength combinations; and
   selecting the plurality of sensor modules according to expected fluorescence signals of a polymerase chain reaction.

15. A system comprising:
   a fluorescence detector including an array of sensor modules arranged in a planar tiling pattern with respect a longitudinal axis of a receptacle, each sensor module including:
      a body of a tileable shape;
      a light source coupled to the body; and
      a plurality of light sensors coupled to the body, the plurality of light sensors to sense different wavelengths of light, wherein the plurality of light sensors and the light source have different optical paths between the body and the receptacle;
   a cartridge carrying a planar target, the cartridge removably insertable into the receptacle, the planar target including a reaction chamber and a heater for a nucleic acid amplification process, wherein the array of sensor modules is to align with a longitudinal axis of the reaction chamber to sense fluorescence signals of the nucleic acid amplification process.

* * * * *